(12) United States Patent
Lu et al.

(10) Patent No.: US 12,493,372 B2
(45) Date of Patent: Dec. 9, 2025

(54) DISPLAY PANEL AND DISPLAY DEVICE

(71) Applicant: Shanghai Tianma Microelectronics Co., Ltd., Shanghai (CN)

(72) Inventors: Feng Lu, Shanghai (CN); Feng Qin, Shanghai (CN); Qijun Yao, Shanghai (CN); Yang Zeng, Shanghai (CN); Quanpeng Yu, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 0 days.

(21) Appl. No.: 18/749,668

(22) Filed: Jun. 21, 2024

(65) Prior Publication Data

US 2024/0338091 A1 Oct. 10, 2024

(30) Foreign Application Priority Data

Aug. 29, 2023 (CN) .......................... 202311103346.X

(51) Int. Cl.
*G06F 3/041* (2006.01)
*G06F 3/044* (2006.01)
*G06F 3/046* (2006.01)
*H01L 25/16* (2023.01)
*H10D 86/40* (2025.01)
*H10D 86/60* (2025.01)
*H10H 20/857* (2025.01)

(52) U.S. Cl.
CPC .......... *G06F 3/0412* (2013.01); *G06F 3/0445* (2019.05); *G06F 3/0446* (2019.05); *G06F 3/046* (2013.01); *H01L 25/167* (2013.01); *H10D 86/441* (2025.01); *H10D 86/60* (2025.01); *H10H 20/857* (2025.01); *G06F 2203/04111* (2013.01)

(58) Field of Classification Search
CPC ......... H01L 25/167; G06F 2203/04111; G06F 3/0412; G06F 3/04164; G06F 3/0443; G06F 3/0445; G06F 3/0446; G06F 3/046; G09G 2310/0275; G09G 3/32; H10D 86/441; H10D 86/60; H10H 20/857
See application file for complete search history.

(56) References Cited

U.S. PATENT DOCUMENTS

| 2014/0240618 | A1* | 8/2014 | Oraw | ............... G06F 3/0443 349/12 |
| 2016/0378209 | A1* | 12/2016 | Wong | ............... G06F 3/0383 345/174 |
| 2017/0102797 | A1* | 4/2017 | Cok | ............... H10H 20/857 |

* cited by examiner

*Primary Examiner* — Robin J Mishler
(74) *Attorney, Agent, or Firm* — Wiersch Law Group

(57) ABSTRACT

A display panel and a display device are provided, The display panel includes: a circuit layer, a light-emitting device layer located at a side of the circuit layer and including vertical light-emitting diodes; and a touch structure. A part of the touch structure is located between the light-emitting device layer and the circuit layer, and/or a part of the touch structure is located at a side of the light-emitting device layer away from the circuit layer.

37 Claims, 35 Drawing Sheets

DISPLAY PANEL AND DISPLAY DEVICE

CROSS-REFERENCE TO RELATED APPLICATIONS

The present application claims priority to Chinese Patent Application No. 202311103346.X, filed on Aug. 29, 2023, the content of which is incorporated herein by reference in its entirety.

TECHNICAL FIELD

The present disclosure relates to the technical field of displays, and in particular, to a display panel and a display device.

BACKGROUND

Micro light-emitting diode (Micro LED) display panels are widely used in various display fields due to their high luminous efficiency, compact structure, excellent reliability, and other advantages.

Currently, to achieve a touch function of the Micro LED display panel, a touch substrate is usually provided externally at an outer side of a display substrate. However, the superimposition of two substrates causes a relatively large overall thickness of the module. Especially in a wearable display product, this will greatly cancel out the thin and light advantages of the micro LED display technology.

SUMMARY

In view of this, embodiments of the present disclosure provide a display panel and a display device, to achieve the integrated touch design of the display panel and make modules thereof thinner and lighter.

An embodiment of the present disclosure provides a display panel, including: a circuit layer; a light-emitting device layer located at a side of the circuit layer and including vertical light-emitting diodes; and a touch structure. A part of the touch structure is located between the light-emitting device layer and the circuit layer, and/or a part of the touch structure is located at a side of the light-emitting device layer away from the circuit layer.

An embodiment of the present disclosure provides a display device including a display panel. The display panel includes: a circuit layer; a light-emitting device layer located at a side of the circuit layer and including vertical light-emitting diodes; and a touch structure. A part of the touch structure is located between the light-emitting device layer and the circuit layer, and/or a part of the touch structure is located at a side of the light-emitting device layer away from the circuit layer.

BRIEF DESCRIPTION OF DRAWINGS

To better illustrate the technical solutions in the embodiments of the present disclosure more clearly, the following briefly describes the accompanying drawings required to be used in the embodiments. Apparently, the accompanying drawings in the following description show merely some embodiments of the present disclosure, and a person of ordinary skill in the art may still derive other accompanying drawings from these accompanying drawings without creative efforts.

DESCRIPTION OF EMBODIMENTS

For better illustrating the technical solutions of the present disclosure, the embodiments of the present disclosure are described in detail below with reference to the accompanying drawings.

It should be noted that the embodiments in the following descriptions are merely some rather than all of the embodiments of the present disclosure. All other embodiments obtained by a person of ordinary skill in the art on the basis of the embodiments of the present disclosure without creative efforts shall fall within the protection scope of the present disclosure.

Terms used in the embodiments of the present disclosure are only for the purpose of describing specific embodiments, and are not intended to limit the present disclosure. Unless otherwise specified in the context, words, such as "a", "the", and "this", in a singular form in the embodiments of the present disclosure and the appended claims include plural forms.

It should be understood that the term "and/or" in this specification merely describes associations between associated objects, and it indicates three types of relationships. For example, A and/or B may indicate that A exists alone, A and B coexist, or B exists alone. In addition, the character "/" in this specification generally indicates that the associated objects are in an "or" relationship.

Figure 1:
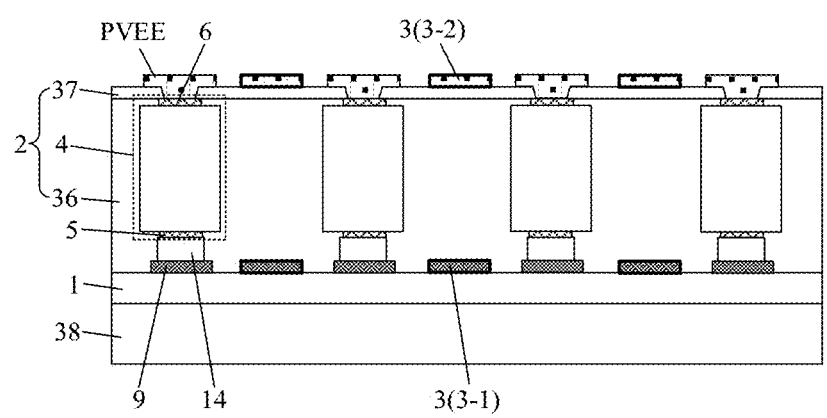
FIG. 1 is a schematic cross-sectional view of a display panel according to an embodiment of the present disclosure.

An embodiment of the present disclosure provides a display panel, as shown in FIG. 1. FIG. 1 is a schematic cross-sectional diagram of a display panel according to an embodiment of the present disclosure. The display panel includes a circuit layer 1, a light-emitting device layer 2, and a touch structure 3.

The light-emitting device layer 2 is located at a side of the circuit layer 1. The light-emitting device layer 2 includes a vertical light-emitting diode 4. Two electrodes of the vertical light-emitting diode 4 are located at two opposite sides. In an example, referring to FIG. 1, the vertical light-emitting diode 4 includes a first electrode 5 and a second electrode 6. The first terminal 5 is close to the circuit layer 1. The second terminal 6 is away from the circuit layer 1. The vertical light-emitting diode 4 may be a micro LED.

Part of the touch structure 3 is located between the light-emitting device layer 2 and the circuit layer 1, and/or part of the touch structure 3 is located at a side of the light-emitting device layer 2 away from the circuit layer 1. For ease of understanding, in FIG. 1, the part of the touch structure 3 located between the light-emitting device layer 2 and the circuit layer 1 is denoted by a reference numeral 3-1, and the part of the touch structure 3 located at the side of the light-emitting device layer 2 away from the circuit layer 1 is denoted by a reference numeral 3-2.

In this embodiment of the present disclosure, a film layer of the touch structure 3 used for implementing a touch function is integrated inside a display substrate. Therefore, there is no need to separately provide a touch substrate outside the display substrate, thereby helping reduce an overall thickness of a display module, and thus making the display module thinner and lighter.

However, it should be emphasized that in this embodiment of the present disclosure, during implementation of the integrated touch design, the following factors are also considered:

First, in this embodiment of the present disclosure, the film layer of the touch structure 3 is selectively provided between the light-emitting device layer 2 and the circuit layer 1 and/or at the side the light-emitting device layer 2 away from the circuit layer 1. Compared with a case that the film layer of the touch structure 3 is provided inside the circuit layer 1, the position of the film layer in this embodiment of the present disclosure can reduce a distance between the touch structure 3 and a light exit surface of the display panel. In this way, the touch structure 3 can sense a finger touch or a stylus touch more obviously, and thus a signal change caused by the touch can be more easily recognized.

Second, the display panel provided in this embodiment of the present disclosure uses the vertical light-emitting diode 4 as a light-emitting element. Because the two electrodes of such a vertical light-emitting diode 4 are located at different sides, compared with a light emitting diode whose two electrodes are located at a same side, such a vertical light-emitting diode 4 may have a smaller cross-sectional area in a direction parallel to a plane of the display panel. In this case, with a fixed pixel density, a spacing between the vertical light-emitting diodes 4 can be made larger, such that there is sufficient wiring space between the vertical light-emitting diodes 4. In this way, when the film layer of the touch structure 3 is selectively disposed between the light-emitting device layer 2 and the circuit layer 1 and/or the side of the light-emitting device layer 2 away from the circuit layer 1, the film layer of the touch structure 3 can be arranged within the space between the vertical light-emitting diodes 4 as much as possible. For example, the film layer of the touch structure 3 can be arranged not to overlap the vertical light-emitting diode 4, to prevent the touch structure 3 from affecting original wiring at upper and lower sides of the vertical light-emitting diode 4 (for example, a lapping electrode 9 at the lower side the vertical light-emitting diode 4 and a second power wire PVEE at the upper side of the vertical light-emitting diode 4), and also prevent the touch structure 3 from shielding normal light emission of the vertical light-emitting diode 4, such that the display panel has a better integrated touch design.

Figure 2:
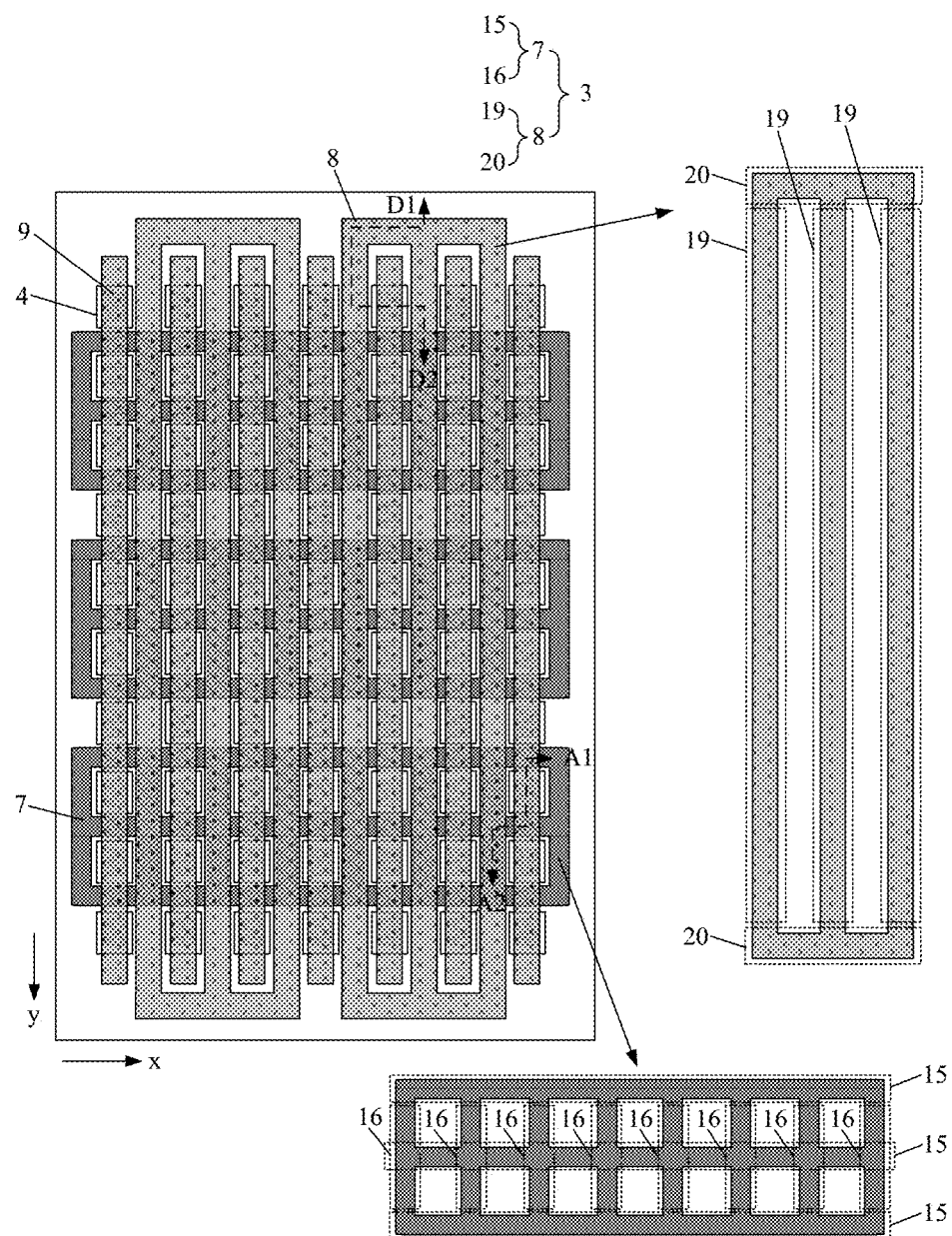
FIG. 2 is a top view of a display panel according to an embodiment of the present disclosure.
Figure 3:
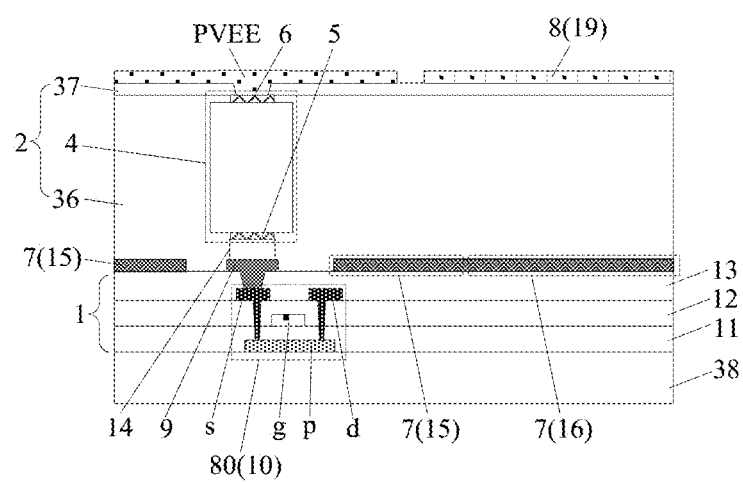
FIG. 3 is a cross-sectional view along A1-A2 shown in FIG. 2.
Figure 10:
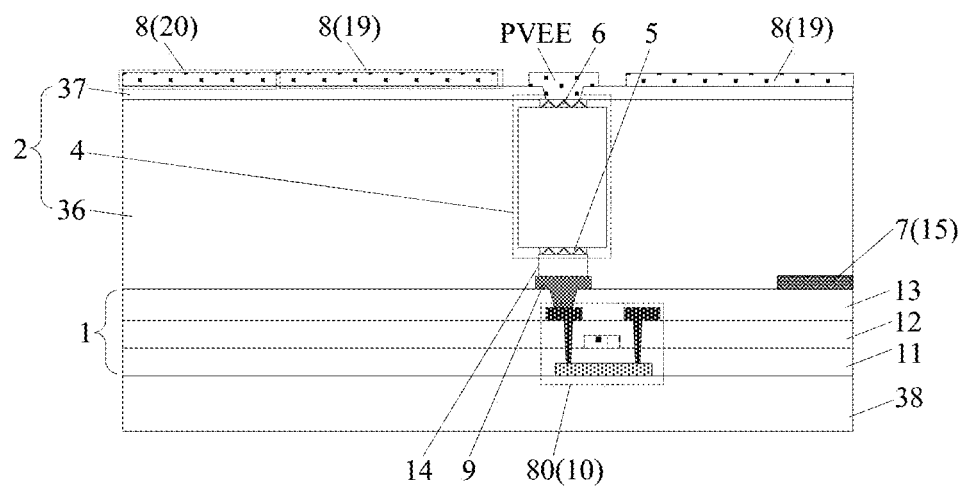
FIG. 10 is a cross-sectional view along D1-D2 shown in FIG. 2.

In a feasible implementation, as shown in FIG. 2, FIG. 2 is a top view of a display panel according to an embodiment of the present disclosure. The touch structure 3 includes a plurality of first touch electrodes 7 and a plurality of second touch electrodes 8. In a direction perpendicular to a plane of the display panel, the first touch electrode 7 overlaps the second touch electrode 8. With reference to FIG. 3 and FIG. 10, at least part of the first touch electrode 7 is located between the light-emitting device layer 2 and the circuit layer 1, and/or at least part of the second touch electrode 8 is located at the side of the light-emitting device layer 2 away from the circuit layer 1.

The touch structure 3 implements detection of a touch position by using a mutual capacitance or magnetic field generated between the first touch electrode 7 and the second touch electrode 8. In an example, the touch structure 3 performs capacitive touch. Based on a manner of setting a position of the film layer of the touch structure 3, at least part of the first touch electrode 7 and at least part of the second touch electrode 8 may be spaced apart by the light-emitting device layer 2. Because the light-emitting device layer 2 includes the vertical light-emitting diode 4 with a large height dimension, an overall thickness of the light-emitting device layer 2 is relatively large, for example, greater than 10 μm. In this case, coupling between the first touch electrode 7 and the second touch electrode 8 at the overlapping position can be reduced. Because the first touch electrode 7 and the second touch electrode 8 perform touch detection by using a side capacitance, after the coupling between the first touch electrode 7 and the second touch electrode 8 at the overlapping position is reduced, a vertical capacitance between the two can be reduced, thereby preventing the vertical capacitance of the two from being too large to cause an overall capacitance formed by the two to be too large. In this way, when a finger touches a screen to cause a capacitance change, an amount of the capacitance change can be obviously reflected on an initial capacitance between the first touch electrode 7 and the second touch electrode 8, such that the capacitance change can be accurately detected.

For the first touch electrode 7 of the touch structure 3, in a feasible implementation, with reference to FIG. 2 and FIG. 3, FIG. 3 is a cross-sectional view along A1-A2 shown in FIG. 2, the circuit layer 1 includes a driver circuit 80. The driver circuit 80 is electrically connected to the vertical light-emitting diode 4 through a lapping electrode 9. The lapping electrode 9 is located between the circuit layer 1 and the light-emitting device layer 2.

In an example, the driver circuit 80 includes a transistor 10. The transistor 10 includes an active layer p, a gate g, a source s, and a drain d. In addition, the circuit layer 1 further includes a first insulating layer 11, a second insulating layer 12, and a first planarization layer 13. The lapping electrode 9 is located between the first planarization layer 13 and the light-emitting device layer 2. On the one hand, the lapping electrode 9 is electrically connected to the transistor 10, and on the other hand, the lapping electrode 9 is further electrically connected to the first electrode 5 of the vertical light-emitting diode 4 through an eutectic portion 14, to form a signal transmission path between the driver circuit 80 and the vertical light-emitting diode 4.

The first touch electrode 7 includes a first electrode strip 15 extending along a first direction x. The first electrode strip 15 and the lapping electrode 9 are arranged in a same layer. Further, in the direction perpendicular to the plane of the display panel, the lapping electrode 9 overlaps the vertical light-emitting diode 4, and the first electrode strip 15 does not overlap the vertical light-emitting diode 4.

As described above, affected by the electrode positions, a cross-sectional area of the vertical light-emitting diode 4 in a direction parallel to a plane of the display panel can be made smaller. Correspondingly, a spacing between adjacent vertical light-emitting diodes 4 is slightly larger. Because lapping electrodes 9 are block structures that have a one-to-one correspondence with the vertical light-emitting diodes 4, a distance between the lapping electrodes 9 is correspondingly larger. Based on this, by disposing the first electrode strip 15 on the layer of the lapping electrode 9, on the one hand, an original metal layer in the display substrate can be used to form the first electrode strip 15 without adding any additional patterning process, and on the other hand, it can be ensured that the first electrode strip 15 can have a sufficient line width, which helps reduce load of the first touch electrode 7, thereby reducing a voltage drop of a signal transmitted on the first touch electrode 7.

In a feasible implementation, with reference to FIG. 2 and FIG. 3, the first touch electrode 7 and the second touch electrode 8 are used for capacitive touch. The first touch electrode 7 includes a plurality of first electrode strips 15. The first touch electrode 7 further includes a plurality of second electrode strips 16 extending along a second direction y. The second direction y intersects the first direction x. The first touch electrode 7 is in a shape of a grid or a lattice, and the second electrode strip 16 and the lapping electrode 9 are arranged in a same layer. Further, in the direction perpendicular to the plane of the display panel, the second electrode strip 16 does not overlap the vertical light-emitting diode 4, and one or more vertical light-emitting diodes 4 are exposed in a mesh formed by the first electrode strips 15 and the second electrode strips 16 intersecting each other vertically and horizontally.

In the foregoing structure, one of the first touch electrode 7 and the second touch electrode 8 is a drive electrode, while the other one of the first touch electrode 7 and the second touch electrode 8 is a sensing electrode. Such a setting manner can achieve the integrated touch design of the capacitive touch display panel to reduce the thickness of such a display module.

In addition, with reference to the foregoing analysis, it can be known that the distance between the lapping electrodes 9 is relatively large. Therefore, when the second electrode strip 16 is also arranged in the layer of the lapping electrode 9, it can also be ensured that the second electrode strip 16 has a sufficient line width. In addition, compared with a manner of using only two second electrode strips 16 to connect heads and ends of a plurality of first electrode strips 15, this embodiment of the present disclosure uses a plurality of second electrode strips 16 and a plurality of first electrode strips 15 to form a grid structure or a lattice structure, this can further reduce the overall load of the first touch electrode 7 to further reduce the voltage drop of the signal.

In addition, the first touch electrode 7 is entirely arranged in a same layer, such that the film design of the first touch electrode 7 is simpler.

Figure 4:
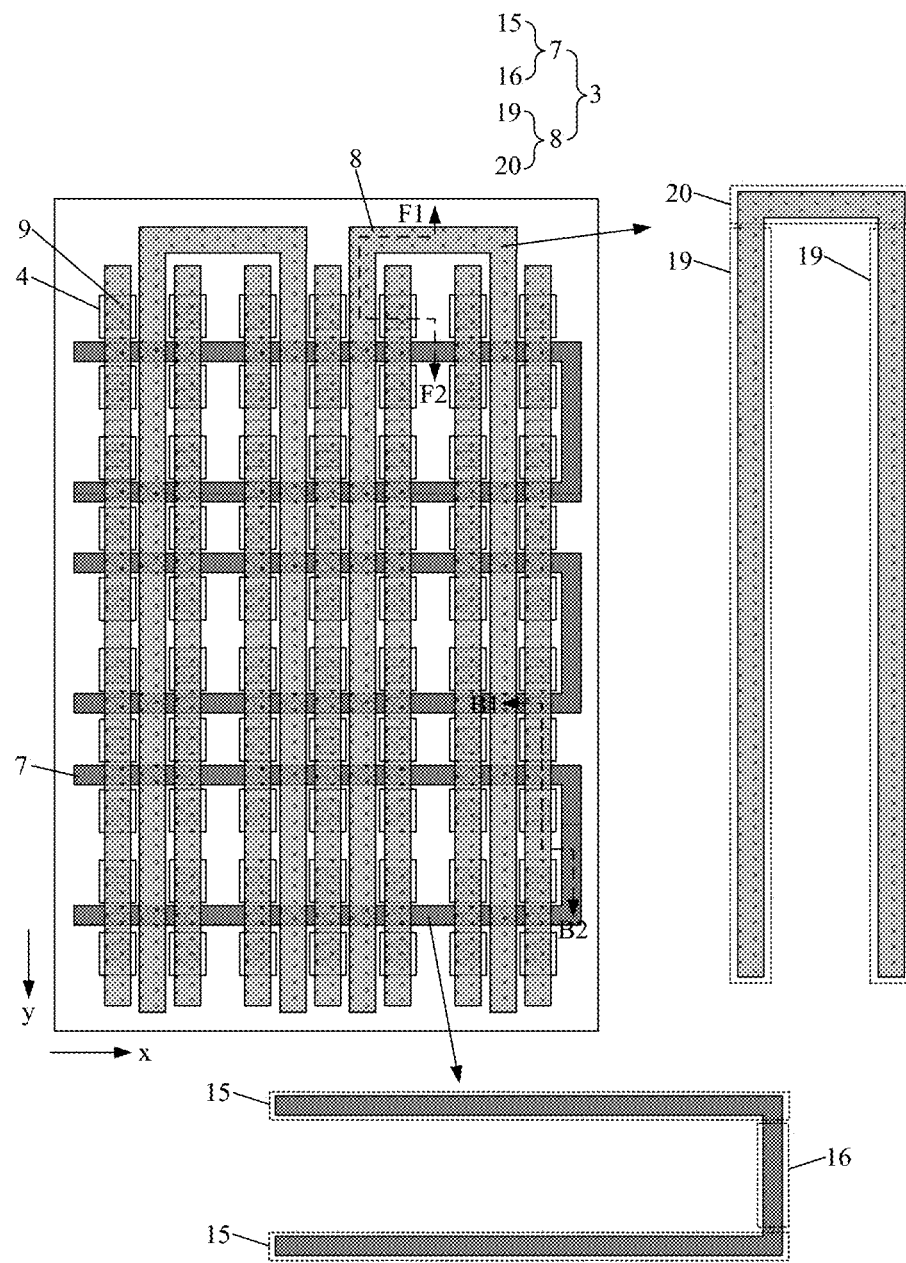
FIG. 4 is another top view of a display panel according to an embodiment of the present disclosure.
Figure 5:
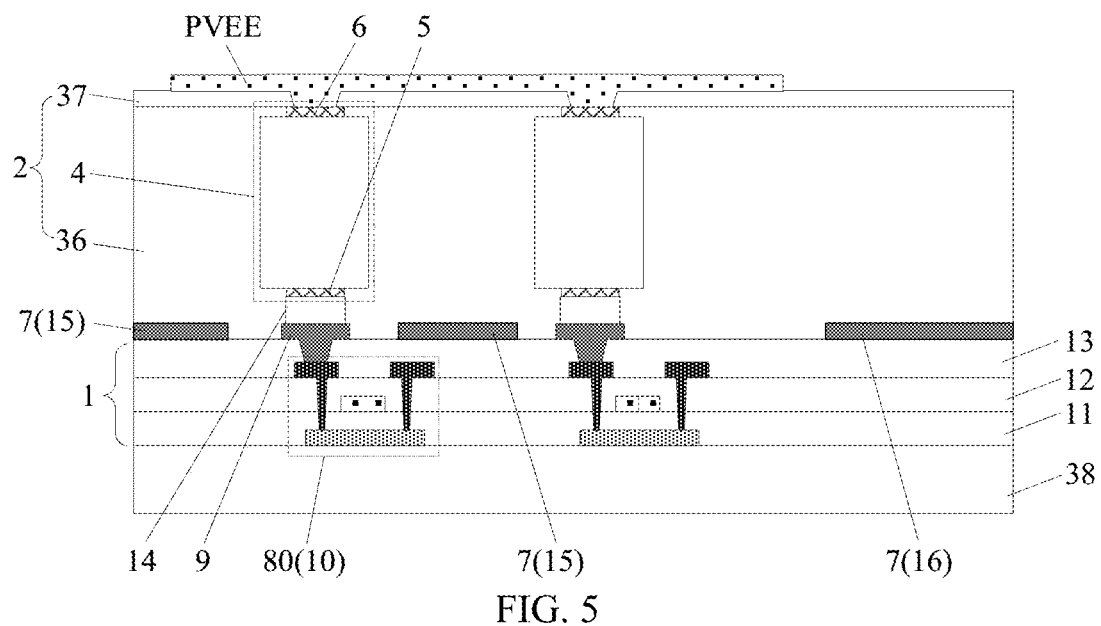
FIG. 5 is a cross-sectional view along B1-B2 shown in FIG. 4.

Alternatively, in another feasible implementation, as shown in FIG. 4 and FIG. 5, FIG. 4 is another top view of a display panel according to an embodiment of the present disclosure, and FIG. 5 is a cross-sectional view along B1-B2 shown in FIG. 4, the first touch electrode 7 and the second touch electrode 8 are used for electromagnetic touch. The first touch electrode 7 includes two first electrode strips 15, and the first touch electrode 7 further includes one second electrode strip 16 extending along a second direction y. The second direction y intersects the first direction x. The second electrode strip 16 is connected to end portions of the two first electrode strips 15, such that the first touch electrode 7 is in a U-shaped structure. The lapping electrode 9 and at least part of the second electrode strip 16 are arranged in a same layer. Further, in the direction perpendicular to the plane of the display panel, the second electrode strip 16 does not overlap the vertical light-emitting diode 4.

In the foregoing structure, one of the first touch electrode 7 and the second touch electrode 8 is a transmitting coil, and the other one of the first touch electrode 7 and the second touch electrode 8 is a receiving coil. Such a setting can achieve the integrated touch design of the electromagnetic touch display panel to reduce the thickness of such a display module.

Figure 6:
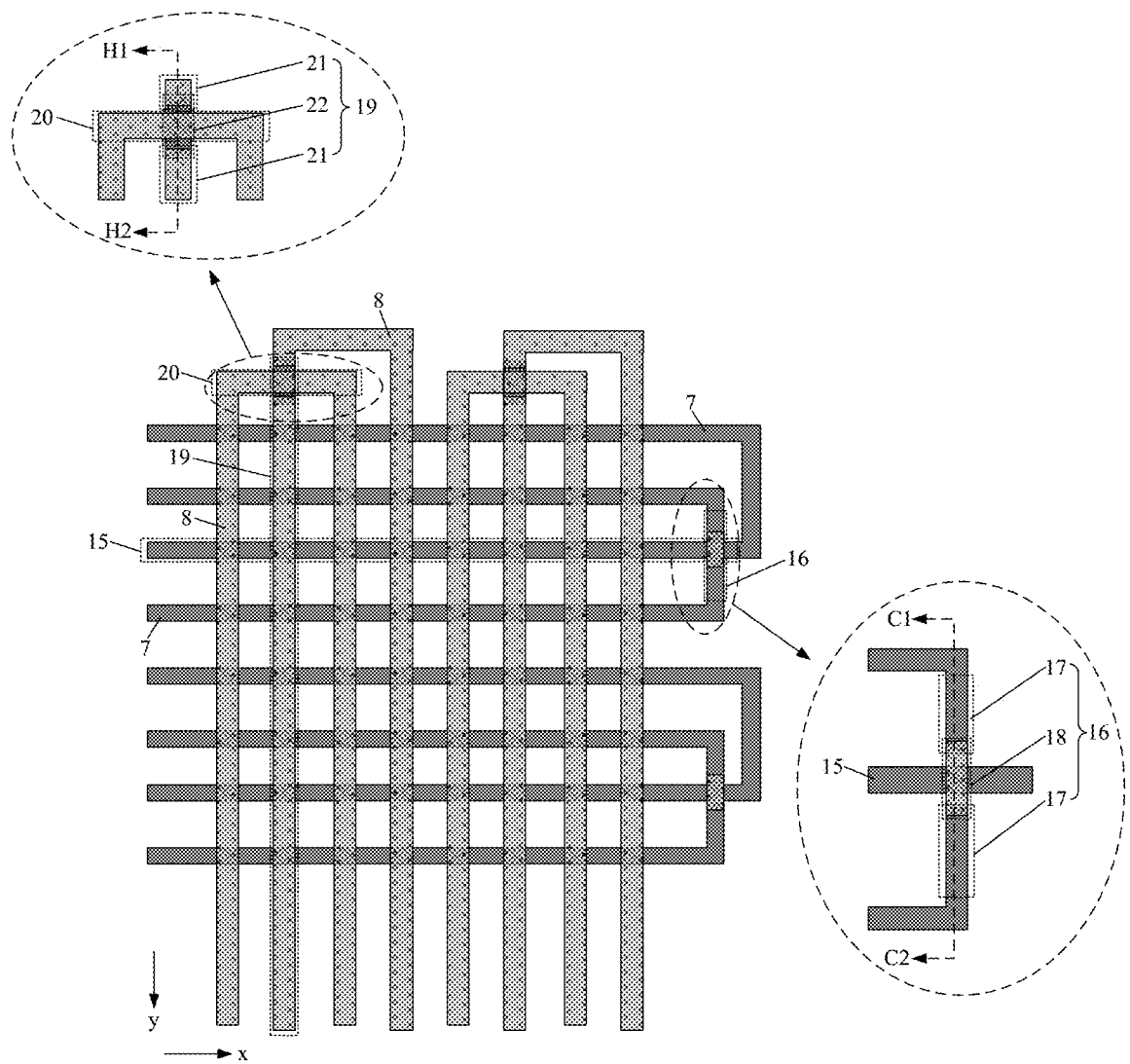
FIG. 6 is another schematic structural diagram of a touch structure according to an embodiment of the present disclosure.
Figure 7:
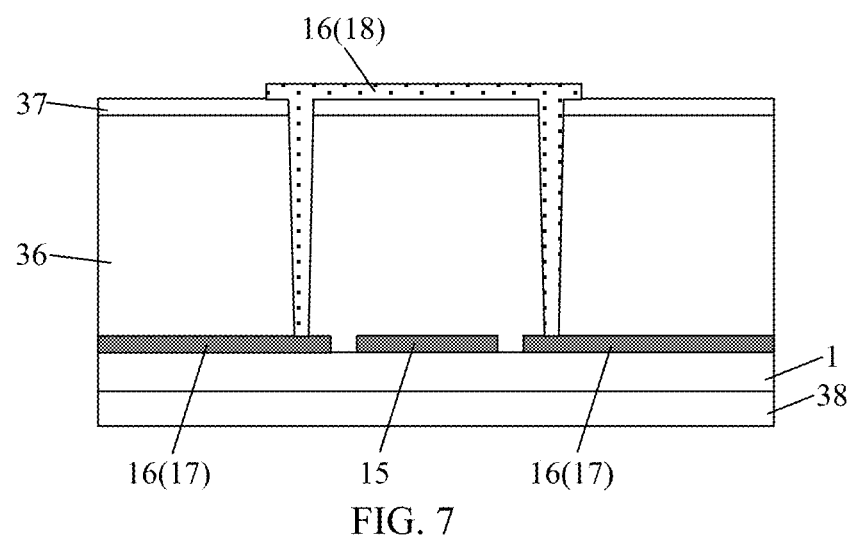
FIG. 7 is a cross-sectional view along C1-C2 shown in FIG. 6.

Further, as shown in FIG. 6 and FIG. 7, FIG. 6 is another schematic structural diagram of a touch structure 3 according to an embodiment of the present disclosure, and FIG. 7 is a cross-sectional view along C1-C2 shown in FIG. 6, in the direction perpendicular to the plane of the display panel, the second electrode strip 16 of one of the first touch electrodes 7 overlaps the first electrode strip 15 of another one of the first touch electrodes 7. The second electrode strip 16 includes a first sub-portion 17 not overlapping the first electrode strip 15 and a second sub-portion 18 overlapping the first electrode strip 15. The first sub-portion 17 and the lapping electrode 9 are provided in a same layer. The second sub-portion 18 and the lapping electrode 9 are provided in different layers.

With a fixed spacing between two first electrode strips 15 in the first touch electrode 7, more coils can be provided in the display panel by causing at least some of the first touch electrodes 7 to overlap each other, thereby helping improve the touch accuracy.

In addition, regarding a film layer position of the second sub-portion 18 in the second electrode strip 16, in an arrangement manner, the second sub-portion 18 may be located at the side of the light-emitting device layer 2 away from the circuit layer 1; alternatively, in another arrangement manner, the second sub-portion 18 may be located in the circuit layer 1, for example, may be provided in a same layer as a source s or a drain d of the transistor 10. In the accompanying drawings of the embodiments of the present disclosure, that the second sub-portion 18 is located at the side the light-emitting device layer 2 away from the circuit layer 1 is used as an example for illustration.

Figure 8:
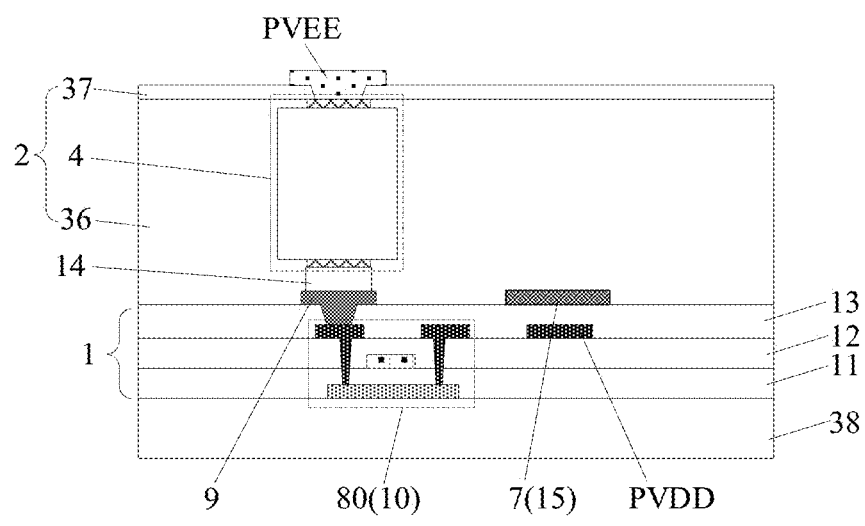
FIG. 8 is another schematic cross-sectional view of a display panel according to an embodiment of the present disclosure.
Figure 9:
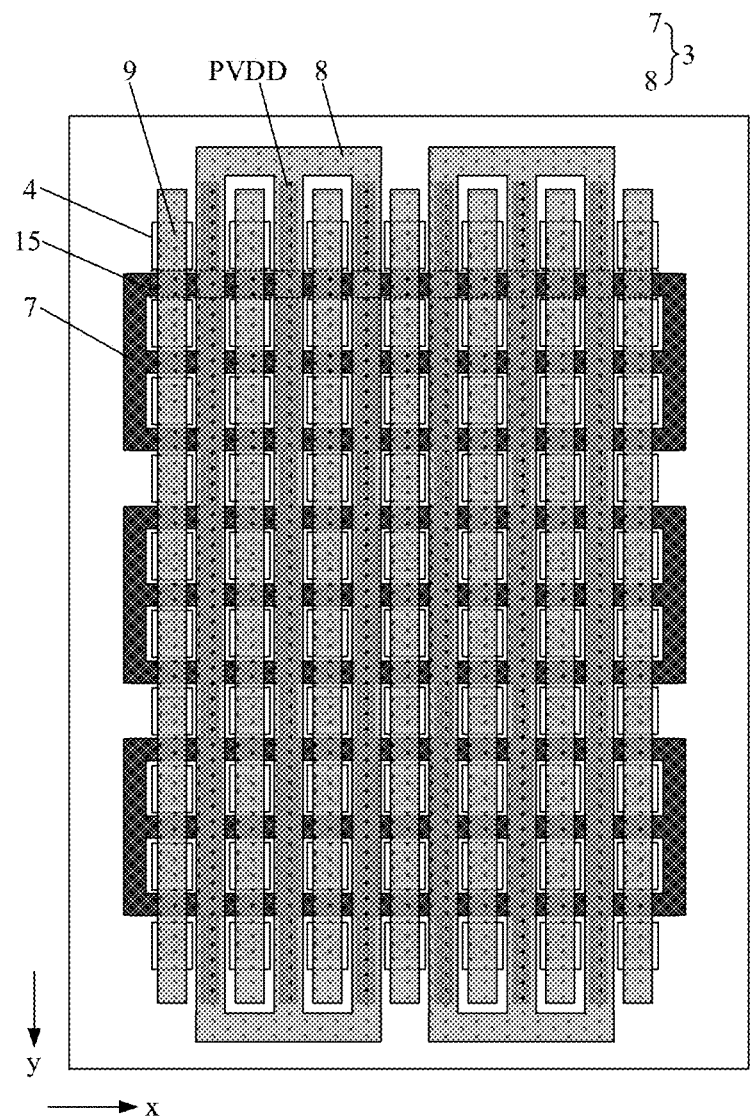
FIG. 9 is still another top view of a display panel according to an embodiment of the present disclosure.

When the first electrode strip 15 extending along the first direction x in the first touch electrode 7 and the lapping electrode 9 are provided in a same layer, in a feasible implementation, as shown in FIG. 8 and FIG. 9, FIG. 8 is another schematic cross-sectional view of a display panel according to an embodiment of the present disclosure, and FIG. 9 is still another top view of a display panel according to an embodiment of the present disclosure, the circuit layer 1 includes a first power wire PVDD extending along a second direction y. The second direction y intersects the first direction x. The first power wire PVDD is electrically connected to the driver circuit 80 (not shown) to provide a first supply voltage to the driver circuit 80.

When the first electrode strip 15 in the first touch electrode 7 is located in a metal layer of the lapping electrode 9, the first electrode strip 15 is relatively close to traces in the circuit layer 1. Therefore, in an embodiment of the present disclosure, an extension direction of a first power wire PVDD in the circuit layer 1 is set to intersect an extension direction of the first electrode strip 15, such that first power wires PVDD and the first electrode strips 15 overlap each other vertically and horizontally. This can reduce an overlapping area between the first electrode strip 15 and the first power wire PVDD and reduce the coupling between the two, thereby effectively reducing signal interference between the first touch electrode 7 and the first power wire PVDD.

For the second touch electrode 8 in the touch structure 3, in a feasible implementation, with reference to FIG. 2, FIG. 3 and FIG. 10, FIG. 10 is a cross-sectional view along D1-D2 shown in FIG. 2, the display panel further includes a second power wire PVEE. The second power wire PVEE extends along a second direction y and is electrically connected to the vertical light-emitting diode 4. The second power wire PVEE is located at the side of the light-emitting device layer 2 away from the circuit layer 1.

The second touch electrode 8 includes third electrode strips 19 extending along the second direction y. The second direction y intersects the first direction x. The third electrode strip 19 is located at the side of the light-emitting device layer 2 away from the circuit layer 1, and adjacent third electrode strips 19 are spaced apart by at least one second power wire PVEE. Further, in the direction perpendicular to the plane of the display panel, the second power wire PVEE overlaps the vertical light-emitting diode 4, and the third electrode strip 19 does not overlap the vertical light-emitting diode 4.

When the third electrode strip 19 in the second touch electrode 8 that extends along the same direction as the second power wire PVEE is located at the side of the light-emitting device layer 2 away from the circuit layer 1, the third electrode strip 19 is located in a spacing between second power wires PVEE. In this case, the third electrode strip 19 and the second power wire PVEE are provided in the same layer, and the third electrode strip 19 and the second power wire PVEE avoid each other to avoid a short circuit; alternatively, the third electrode strip 19 and the second power wire PVEE are provided in different layers, the third electrode strip 19 does not overlap the second power wire PVEE, and the third electrode strip 19 does not shield the vertical light-emitting diode 4.

When the third electrode strip 19 is located at the side of the light-emitting device layer 2 away from the circuit layer 1, in a feasible implementation, with reference to FIG. 2, FIG. 3 and FIG. 10, the third electrode strip 19 and the second power wire PVEE are provided in a same layer. In this case, an original film layer in the display substrate can be used to form the third electrode strip 19 without adding any additional patterning process, and the display module is lighter and thinner.

In addition, with reference to the foregoing analysis, it can be learned that the distance between the vertical light-emitting diodes 4 is relatively large, and correspondingly, the distance between the second power wires PVEE is also relatively large. Therefore, when the third electrode strip 19 is disposed in the layer of the second power wire PVEE, it can also be ensured that the third electrode strip 19 has a sufficient line width to help reduce the load of the second touch electrode 8.

It should be noted that, when the third electrode strip 19 and the second power wire PVEE are provided in a same layer, the third electrode strip 19 and the second power wire PVEE may be formed by using a light-transmitting conductive material such as indium tin oxide.

In a feasible implementation, with reference to FIG. 2, FIG. 3 and FIG. 10, the first touch electrode 7 and the second touch electrode 8 are used for capacitive touch. The second touch electrode 8 includes a plurality of third electrode strips 19. The second touch electrode 8 further includes two fourth electrode strips 20 extending along the first direction x. The first direction x intersects the second direction y. One of the two fourth electrode strips 20 is connected to first end portions of the third electrode strips 19, and the other one of the two fourth electrode strips 20 is connected to second end portions of the third electrode strips 19. The fourth electrode strip 20 and the second power wire PVEE are provided in a same layer. Further, in the direction perpendicular to the plane of the display panel, the fourth electrode strip 20 does not overlap the vertical light-emitting diode 4.

In such a structure, the fourth electrode strip 20 in the second touch electrode 8 is also provided in the same layer as the second power wire PVEE. In this case, the second touch electrode 8 is entirely located in only one layer, such that the film design of the second touch electrode 8 is simpler.

Figure 11:
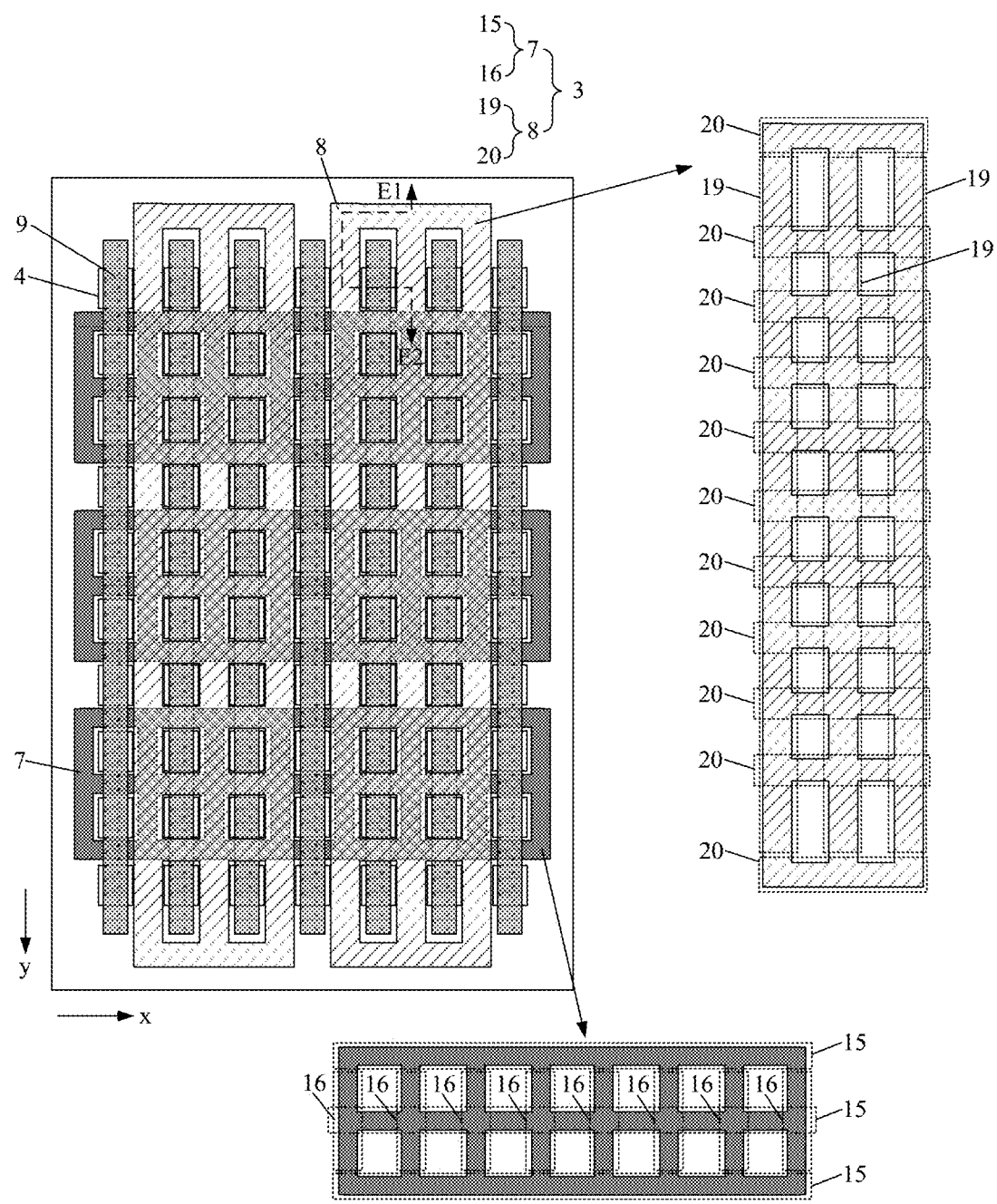
FIG. 11 is still another top view of a display panel according to an embodiment of the present disclosure.
Figure 12:
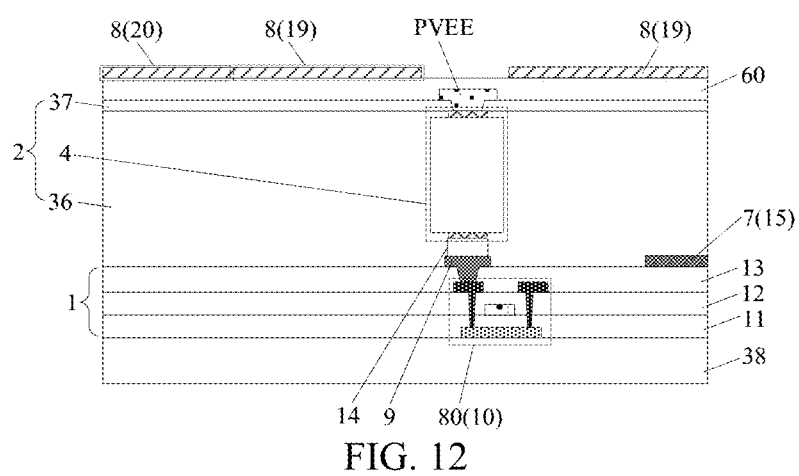
FIG. 12 is a cross-sectional view along E1-E2 shown in FIG. 11.

When the third electrode strip 19 is located at the side of the light-emitting device layer 2 away from the circuit layer 1, in another feasible implementation, as shown in FIG. 11 and FIG. 12, FIG. 11 is still another top view of a display panel according to an embodiment of the present disclosure, and FIG. 12 is a cross-sectional view along E1-E2 shown in FIG. 11, a film layer of the third electrode strip 19 is located at a side of a film layer of the second power wire PVEE away from the light-emitting device layer 2. The film layer of the third electrode strip 19 and the film layer of the second power wire PVEE are spaced apart by a third insulating layer 60.

The film layer of the third electrode strip 19 is disposed at the side of the film layer of the second power wire PVEE away from the light-emitting device layer 2, such that mutual restrictions on positions of the film layers of the third electrode strip 19 and the second power wire PVEE can be canceled. For example, during the design of the second power wire PVEE, there is no need to consider the need to free up wiring space in the film layer of the second power wire PVEE for the third electrode strip 19. Therefore, the line width of the second power wire PVEE can be appropriately increased to reduce the load of the second power wire PVEE. Alternatively, during the design of the third electrode strip 19, there is no need to consider a problem of a short circuit between the third electrode strip 19 and the second power wire PVEE. Therefore, the line width of the third electrode strip 19 can be appropriately increased to reduce the load of the second touch electrode 8.

In addition, in such an arrangement manner, the third electrode strip 19 does not need to be formed of the same material as the second power wire PVEE. This has fewer restrictions on the material of the third electrode strip 19. For example, to further reduce the load of the second touch electrode 8, the third electrode strip 19 can be formed of a metallic material with a relatively low resistivity.

In a feasible implementation, with reference to FIG. 11 and FIG. 12, the first touch electrode 7 and the second touch electrode 8 are used for capacitive touch, the second touch electrode 8 includes a plurality of third electrode strips 19. The second touch electrode 8 further includes a plurality of fourth electrode strips 20 extending along the first direction x. The first direction x intersects the second direction y. The second touch electrode 8 is in a shape of a grid or a comb. The fourth electrode strip 20 and the third electrode strip 19 are provided in a same layer.

In the foregoing structure, one of the first touch electrode 7 and the second touch electrode 8 is a drive electrode, and the other one of the first touch electrode 7 and the second touch electrode 8 is a sensing electrode. Such a setting can achieve the integrated touch design of the capacitive touch display panel to reduce the thickness of such a display module.

When the fourth electrode strip 20 is located at a side of a film layer of the second power wire PVEE away from the light-emitting device layer 2, there is no need to consider a risk of short circuit with the second power wire PVEE for the fourth electrode strip 20. Therefore, in this case, a plurality of fourth electrode strips 20 may be disposed in the second touch electrode 8, such that the second touch electrode 8 has a grid-shaped structure or a comb-shaped structure with a relatively small load.

In addition, the second touch electrode 8 is entirely arranged in a same layer, such that the film design of the second touch electrode 8 is simpler.

Figure 13:
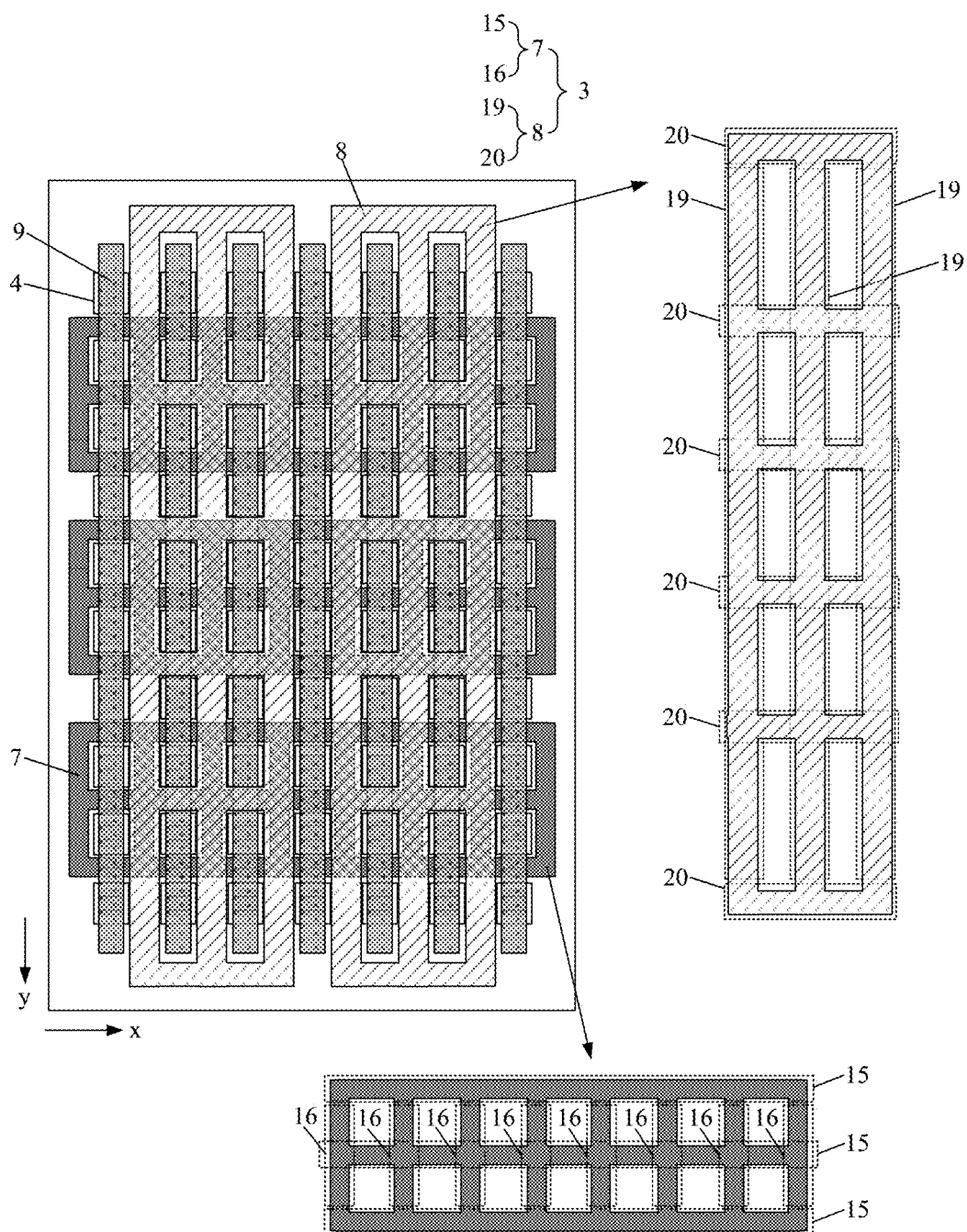
FIG. 13 is still another top view of a display panel according to an embodiment of the present disclosure.

Further, as shown in FIG. 13, FIG. 13 is still another top view of a display panel according to an embodiment of the present disclosure, adjacent fourth electrode strips 20 in the second touch electrode 8 are spaced apart by at least two vertical light-emitting diodes 4 arranged along the second direction y.

Because an extension direction of the fourth electrode strip 20 intersects an extension direction of the second power wire PVEE, at a partially overlapping position between the fourth electrode strip 20 and the first touch electrode 7, a second power wire PVEE is arranged between the fourth electrode strip 20 and the first touch electrode 7. Although the first touch electrode 7 and the second touch electrode 8 implement touch control by using a side capacitance, the second power wire PVEE inserted between the overlapping fourth electrode strip 20 and the first touch electrode 7 does not have a significant impact on the touch control. However, to reduce such cases of impact, two adjacent fourth electrode strips 20 can be spaced apart by at least two vertical light-emitting diodes 4, that is, a respective one fourth electrode strip 20 is provided every two or more rows of vertical light-emitting diodes 4.

Figure 14:
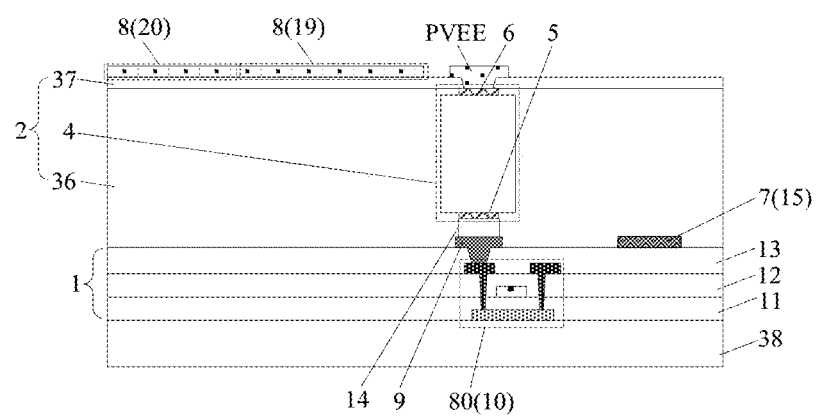
FIG. 14 is a cross-sectional view along F1-F2 shown in FIG. 4.
Figure 15:
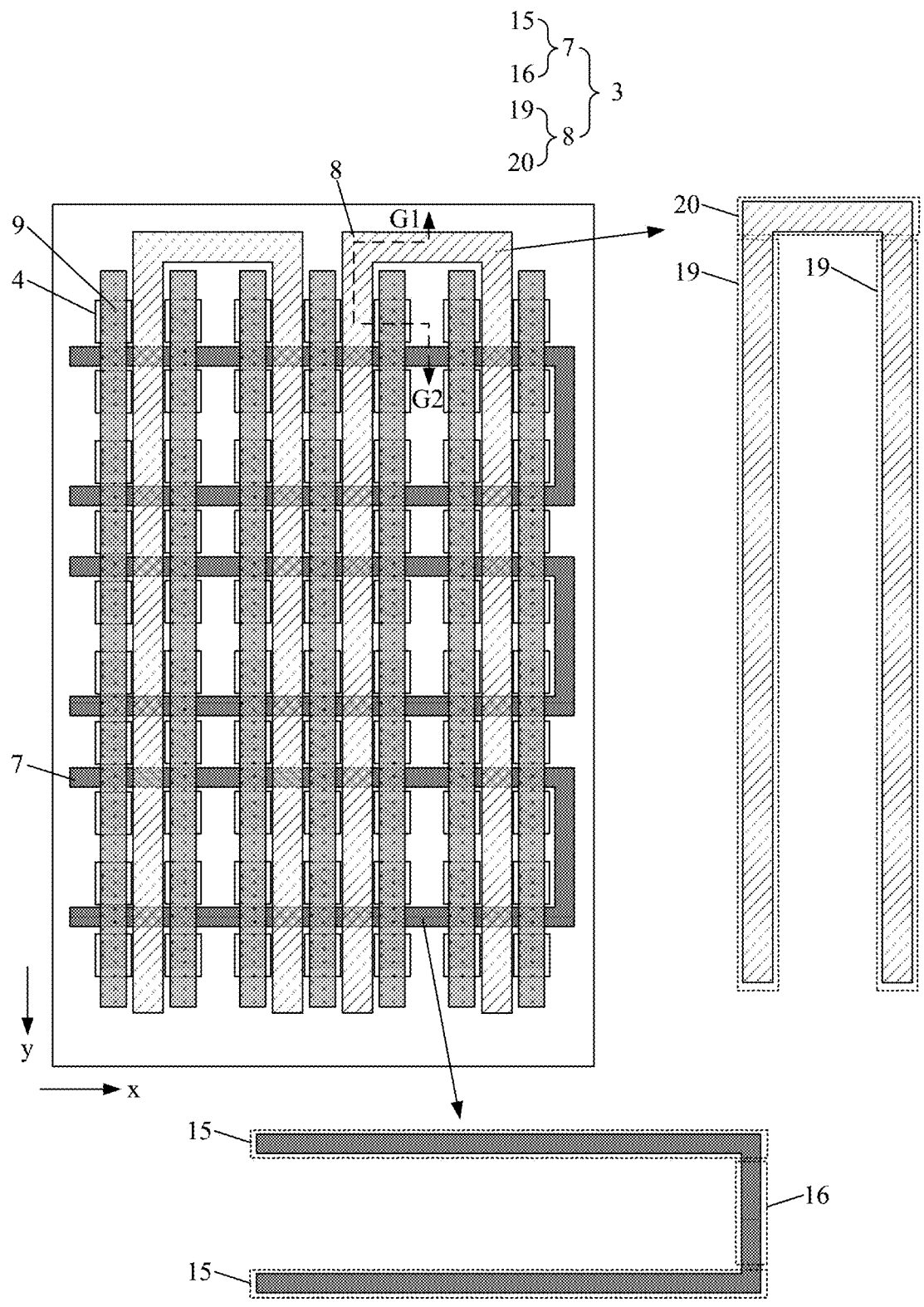
FIG. 15 is still another top view of a display panel according to an embodiment of the present disclosure.
Figure 16:
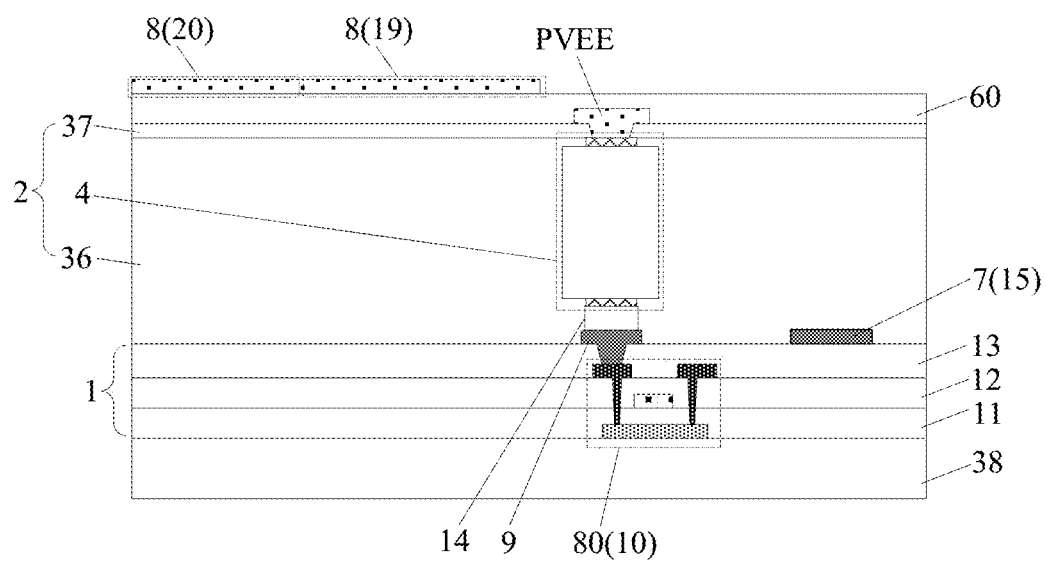
FIG. 16 is a cross-sectional view along G1-G2 shown in FIG. 15.

FIG. 14 is a cross-sectional view along F1-F2 shown in FIG. 4, FIG. 15 is still another top view of a display panel according to an embodiment of the present disclosure, and FIG. 16 is a cross-sectional view along G1-G2 shown in FIG. 15. When the third electrode strip 19 is located at the side of the light-emitting device layer 2 away from the circuit layer 1, in a feasible implementation, with reference to FIG. 4 and FIG. 14, and with reference to FIG. 15 and FIG. 16, the first touch electrode 7 and the second touch electrode 8 are used for electromagnetic touch. The second touch electrode 8 includes two third electrode strips 19, and the second touch electrode 8 further includes one fourth electrode strip 20 extending along the first direction x. The first direction x intersects the second direction y. The fourth electrode strip 20 is connected to end portions of the two third electrode strips 19. The third electrode strip 19 and at least part of the fourth electrode strip 20 are provided in a same layer. FIG. 4 and FIG. 14 provide illustration by using an example in which the third electrode strip 19 and the second power wire PVEE are provided in a same layer. FIG. 15 and FIG. 16 provide illustration by using an example in which a film layer of the third electrode strip 19 is located at a side of a film layer of the second power wire PVEE away from the circuit layer 1.

In the foregoing structure, one of the first touch electrode 7 and the second touch electrode 8 is a transmitting coil, and the other one of the first touch electrode 7 and the second touch electrode 8 is a receiving coil. Such a setting manner can achieve the integrated touch design of the electromagnetic touch display panel to reduce the thickness of such a display module.

Figure 17:
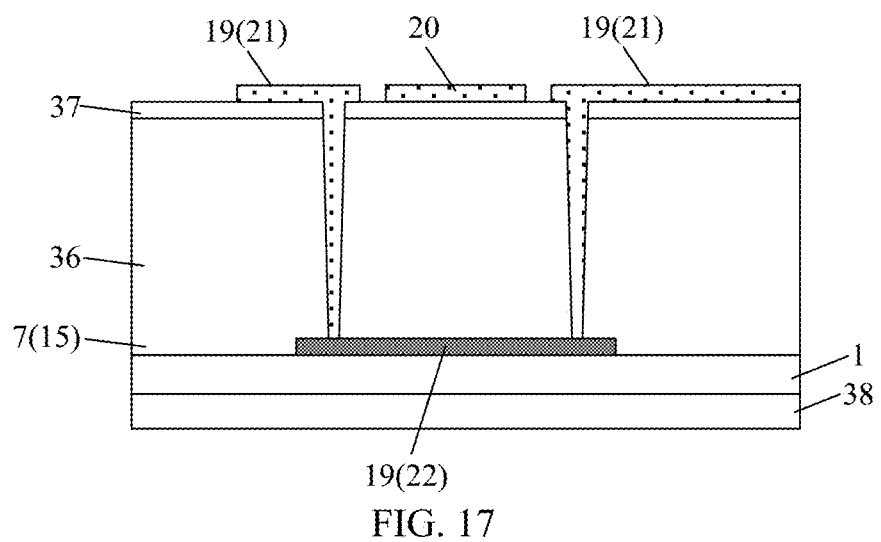
FIG. 17 is a cross-sectional view along H1-H2 shown in FIG. 6.

Further, with reference to FIG. 6 and FIG. 17, FIG. 17 is a cross-sectional view along H1-H2 shown in FIG. 6, in the direction perpendicular to the plane of the display panel, the fourth electrode strip 20 in at least one of the second touch electrodes 8 overlaps the third electrode strip 19 in at least another one of the second touch electrodes 8. At least one of the fourth electrode strips 20 includes a third sub-portion 21 not overlapping the third electrode strip 19 and a fourth sub-portion 22 overlapping the third electrode strip 19. The third sub-portion 21 and the third electrode strip 19 are provided in a same layer. The fourth sub-portion 22 and the third electrode strip 19 are provided in different layers.

With a fixed spacing between two third electrode strips 19 in the second touch electrode 8, more coils can be provided in the display panel by causing at least some of the second touch electrodes 8 to overlap each other, thereby helping improve touch accuracy.

In addition, regarding a film position of the fourth sub-portion 22 in the fourth electrode strip 20, in an arrangement manner, when the third electrode strip 19 and the second power wire PVEE are provided in the same layer, the fourth sub-portion 22 may be provided in a same layer as the lapping electrode 9; alternatively, in another arrangement manner, when the film layer of the third electrode strip 19 is located at the side of the film layer of the second power wire PVEE away from the light-emitting device layer 2, the fourth sub-portion 22 may be provided in the same layer as the second power wire PVEE. In the accompanying drawings of the embodiments of the present disclosure, that the third electrode strip 19 and the second power wire PVEE are provided in a same layer and the fourth sub-portion 22 and the lapping electrode 9 are provided in a same layer is used as an example for illustration.

Figure 18:
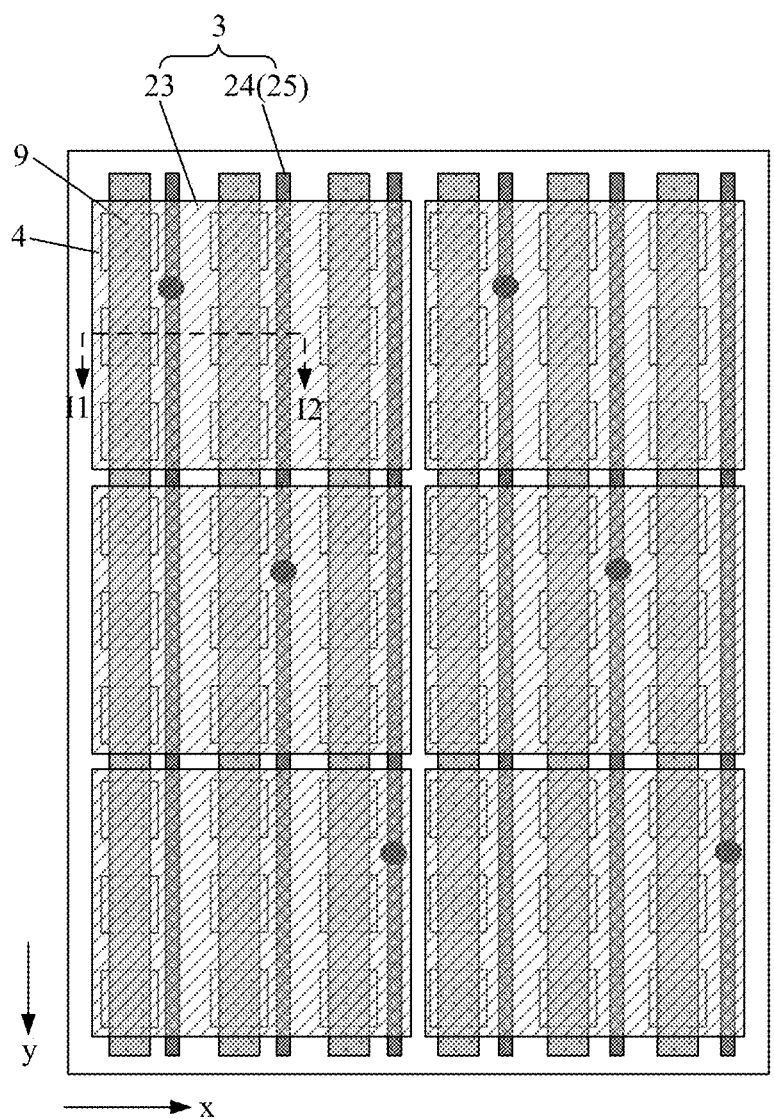
FIG. 18 is still another top view of a display panel according to an embodiment of the present disclosure.
Figure 19:
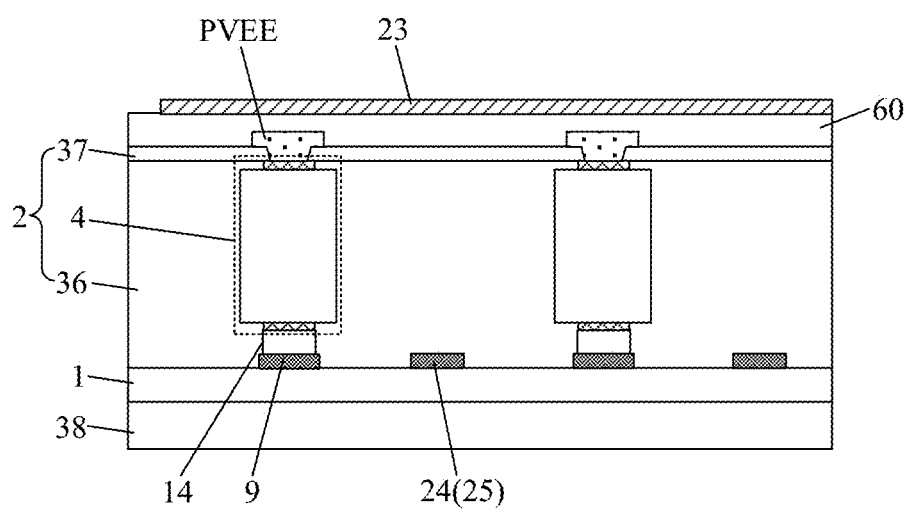
FIG. 19 is a cross-sectional view along I1-I2 shown in FIG. 18.

In a feasible implementation, as shown in FIG. 18 and FIG. 19, FIG. 18 is still another top view of a display panel according to an embodiment of the present disclosure, and FIG. 19 is a cross-sectional view along I1-I2 shown in FIG. 18, the touch structure 3 includes an electrode block 23 and a connection structure 24. The connection structure 24 is electrically connected to at least part of the electrode block 23. The connection structure 24 is located between the light-emitting device layer 2 and the circuit layer 1, and/or at least part of the electrode block 23 is located at the side of the light-emitting device layer 2 away from the circuit layer 1.

Different from the foregoing touch structure 3, in such a touch structure 3, a touch electrode is a block structure and can form a self-capacitive touch structure or a mutual-capacitive touch structure. The connection structure 24 is disposed between the light-emitting device layer 2 and the circuit layer 1, and/or at least part of the electrode block 23 is disposed at the side of the light-emitting device layer 2 away from the circuit layer 1, such that the integrated touch design of such a display panel can be achieved.

In a feasible implementation, referring to FIG. 18 and FIG. 19 again, the connection structure 24 includes a touch line 25. One electrode block 23 is electrically connected to at least one touch line 25.

The touch structure 3 in such a structure includes electrode blocks 23 and touch lines 25, and the touch structure 3 achieves touch detection by using a self-capacitive touch principle.

Figure 20:
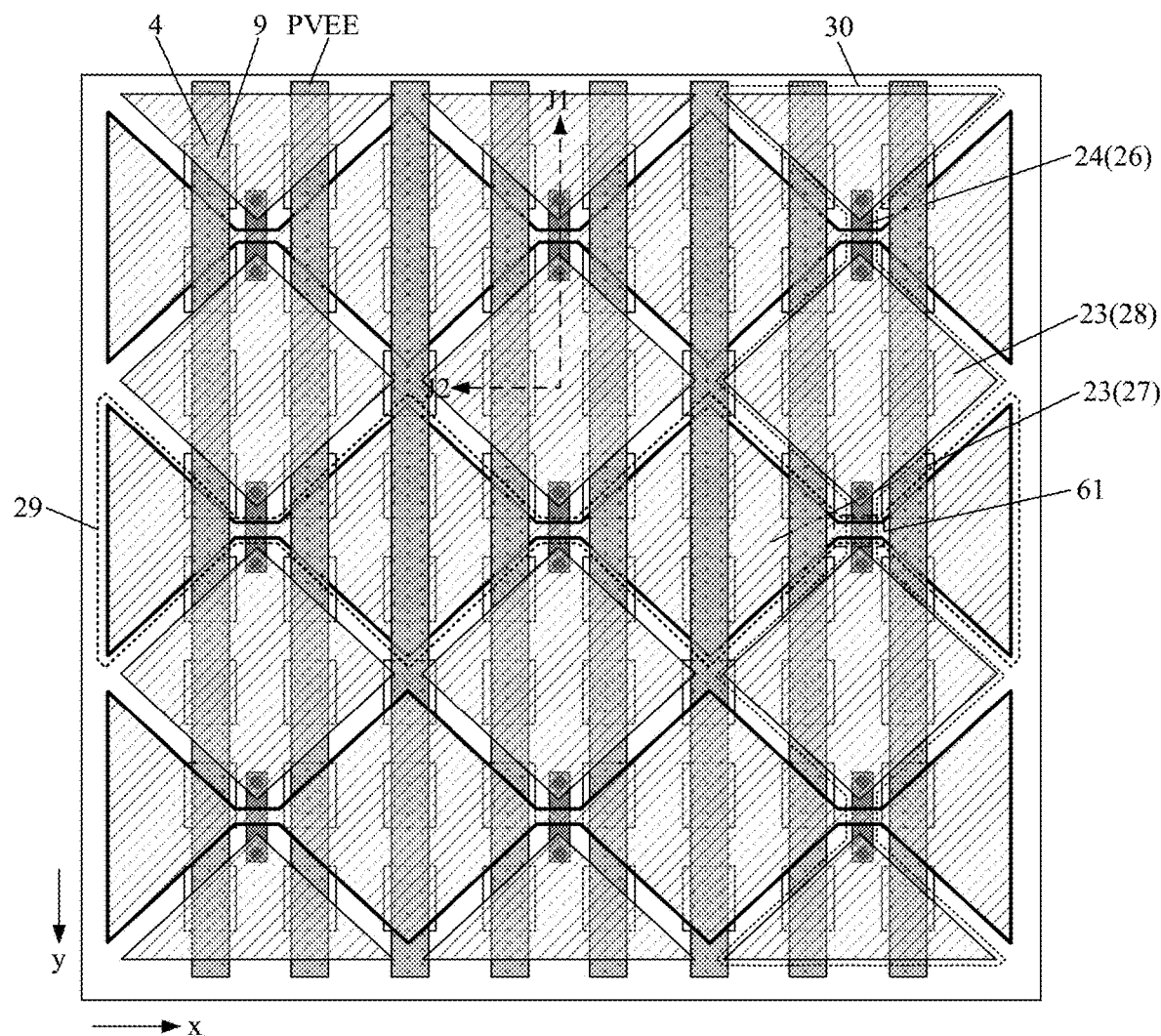
FIG. 20 is still another top view of a display panel according to an embodiment of the present disclosure.
Figure 21:
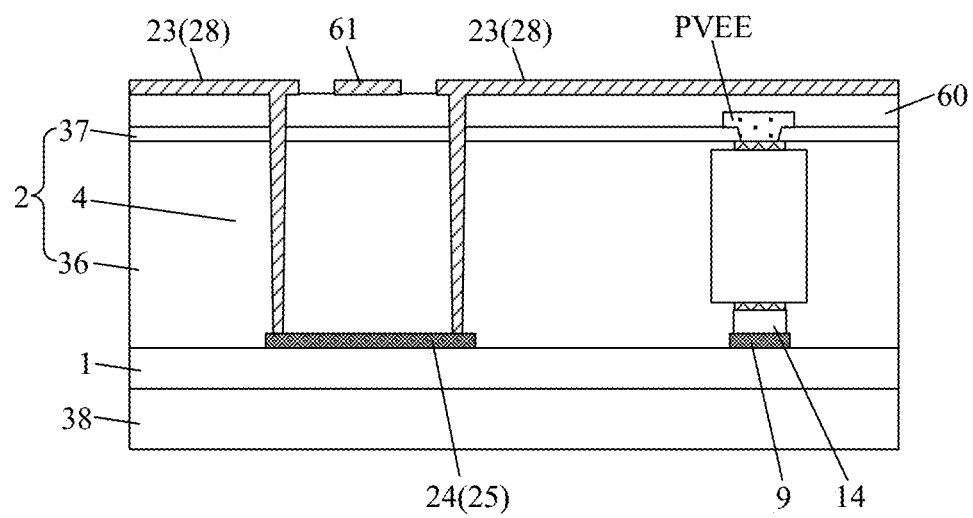
FIG. 21 is a cross-sectional view along J1-J2 shown in FIG. 20.

Alternatively, in another feasible implementation, as shown in FIG. 20 and FIG. 21, FIG. 20 is still another top view of a display panel according to an embodiment of the present disclosure, and FIG. 21 is a cross-sectional view along J1-J2 shown in FIG. 20, the connection structure 24 includes a bridge 26, and adjacent ones of at least some of electrode blocks 23 are electrically connected through the bridge 26.

In an example, the electrode blocks 23 include a first electrode block 27 and a second electrode block 28. The display panel includes third touch electrodes 29 arranged along a second direction y and fourth touch electrodes 30 arranged along the first direction x. The third touch electrode 29 includes a plurality of first electrode blocks 27 arranged along the first direction. Adjacent first electrode blocks 27 in the third touch electrode 29 communicate with each other through a communication portion 61 in the same layer. The fourth touch electrode 30 includes a plurality of second electrode blocks 28 arranged along the second direction y. The connection structure 24 includes the bridge 26. Adjacent second electrode blocks 28 in the fourth touch electrode 30 are connected through the bridge 26.

The touch structure 3 in such a structure includes electrode blocks 23 and bridges 26, and the touch structure 3 achieves touch detection by using a mutual-capacitive touch principle.

In a feasible implementation, referring to FIG. 18 to FIG. 22 again, the display panel further includes a second power wire PVEE. The second power wire PVEE is electrically connected to the vertical light-emitting diode 4. The second power wire PVEE is located at the side of the light-emitting device layer 2 away from the circuit layer 1. A film layer of the electrode block 23 is located at a side of a film layer of the second power wire PVEE away from the circuit layer 1.

Such an arrangement manner can cancel mutual restrictions between the second power wire PVEE and the electrode block 23. For example, the electrode block 23 may be designed as a light-transmitting surface electrode, or the electrode block 23 may be designed as an opaque grid electrode. In addition, during the design of the second power wire PVEE, there is no need to consider to free up space in the film layer of the second power wire PVEE for the electrode block 23. Therefore, the line width of the second power wire PVEE can be appropriately increased. Alternatively, when the electrode block 23 is an opaque grid electrode, there is no need to consider a short circuit between a grid strip in the electrode block 23 and the second power wire PVEE, such that a line width of the grid strip can be appropriately increased.

Figure 22:
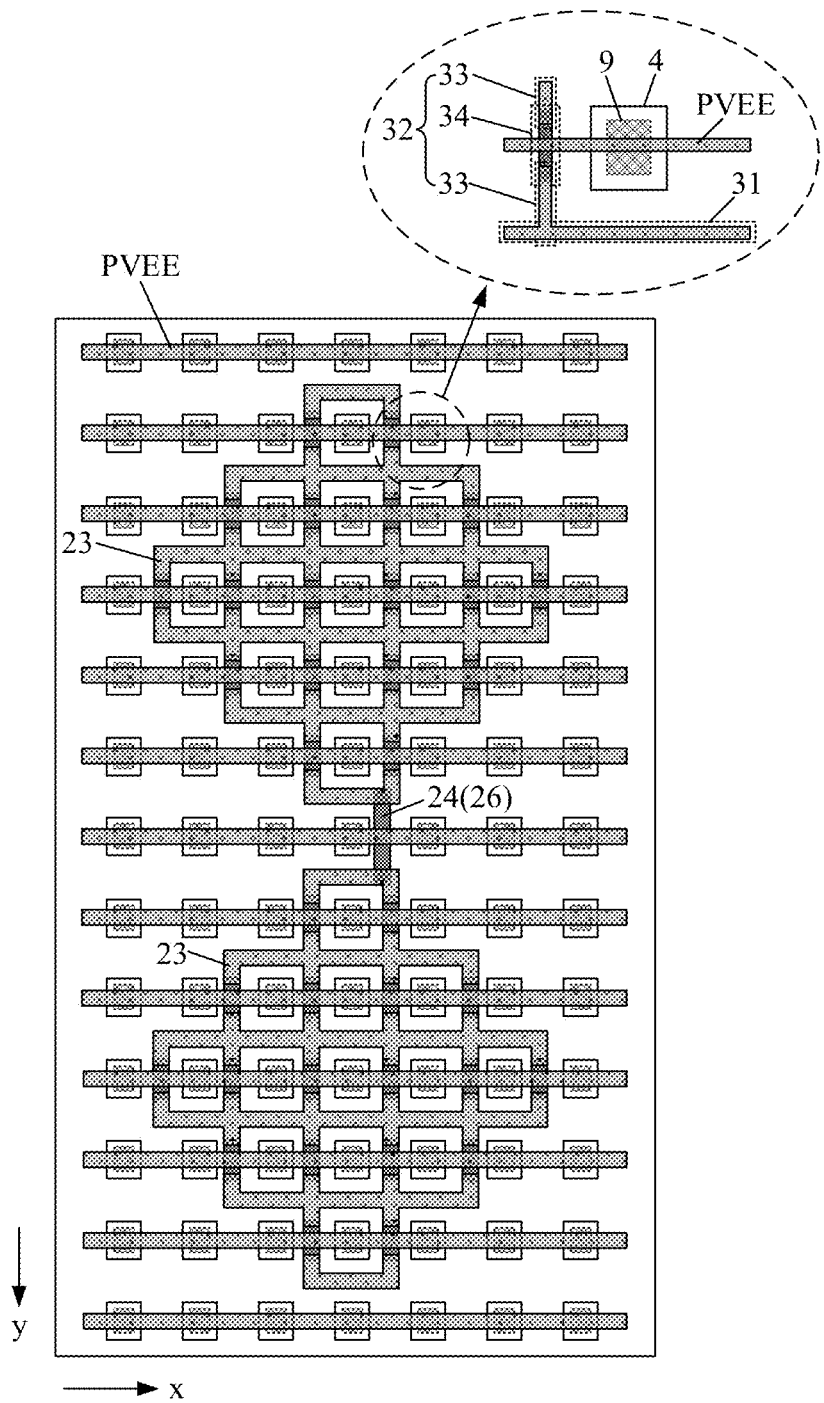
FIG. 22 is still another top view of a display panel according to an embodiment of the present disclosure.
Figure 23:
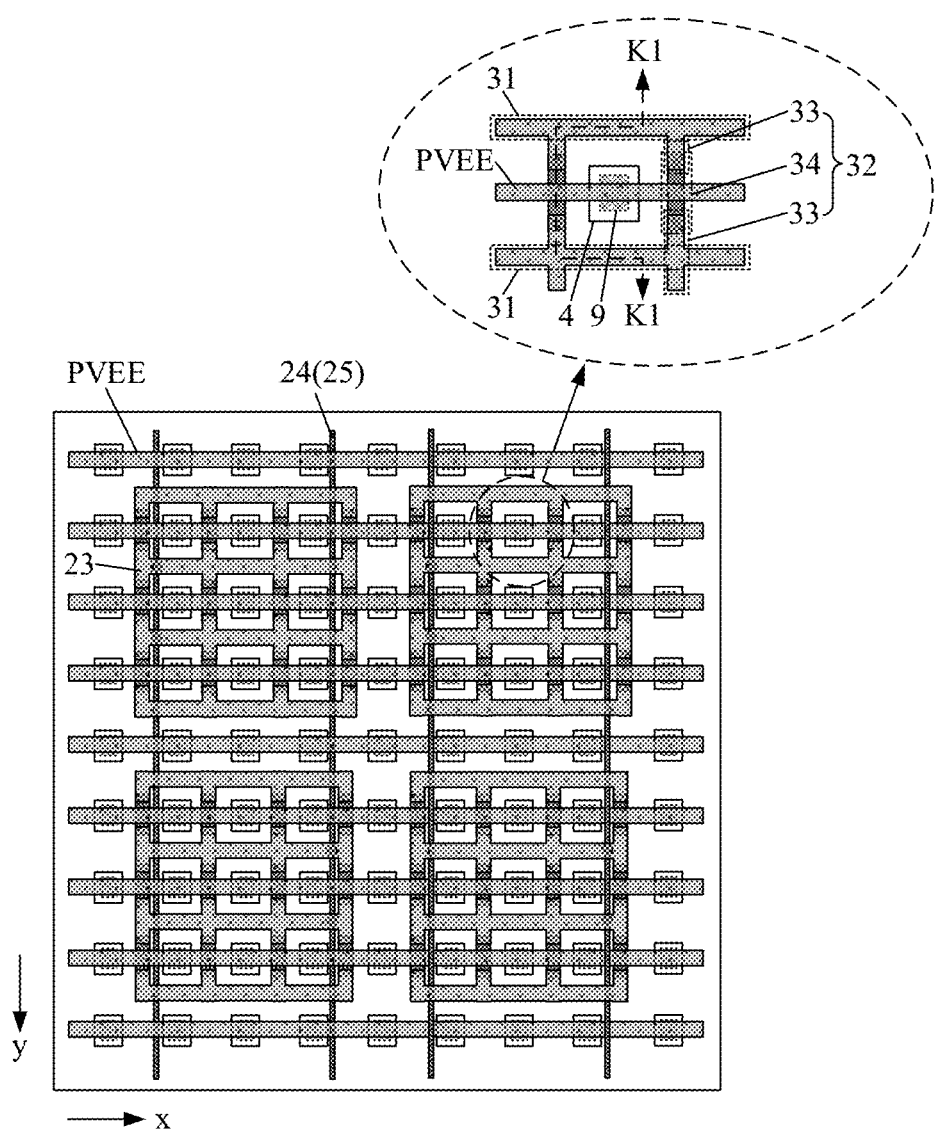
FIG. 23 is still another top view of a display panel according to an embodiment of the present disclosure.
Figure 24:
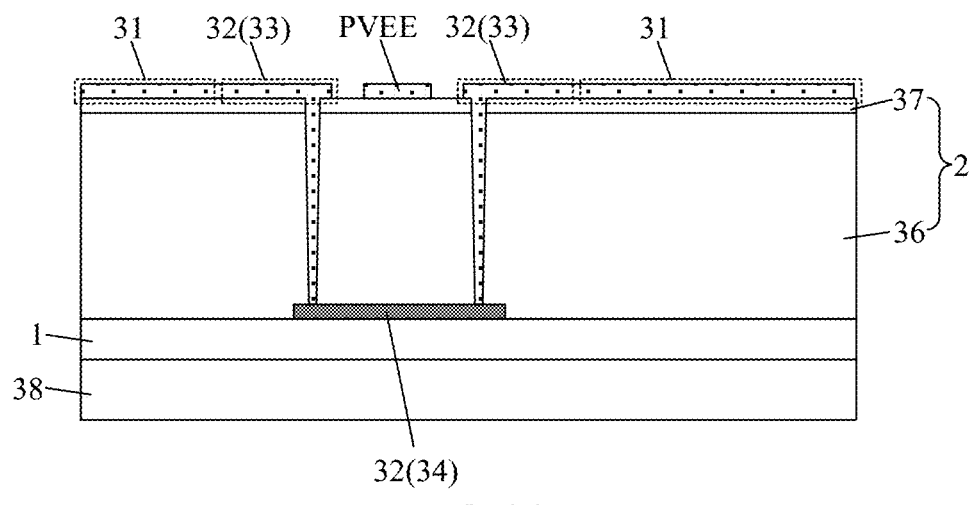
FIG. 24 is a cross-sectional view along K1-K2 shown in FIG. 23.

FIG. 22 is still another top view of a display panel according to an embodiment of the present disclosure, FIG. 23 is still another top view of a display panel according to an embodiment of the present disclosure, and FIG. 24 is a cross-sectional view along K1-K2 shown in FIG. 23. Alternatively, in another feasible implementation, as shown in FIG. 22 to FIG. 24, the display panel further includes a second power wire PVEE. The second power wire PVEE is electrically connected to the vertical light-emitting diode 4. The second power wire PVEE is located at the side of the light-emitting device layer 2 away from the circuit layer 1.

The electrode block 23 in a shape of a grid. The electrode block 23 includes a first grid bar 31 and a second grid bar 32. An extension direction of the first grid bar 31 is parallel to an extension direction of the second power wire PVEE. An extension direction of the second grid bar 32 intersects the extension direction of the second power wire PVEE. The first grid bar 31 and the second power wire PVEE are provided in a same layer. The second grid bar 32 includes a fifth sub-portion 33 not overlapping the second power wire PVEE and a sixth sub-portion 34 overlapping the second power wire PVEE. The fifth sub-portion 33 and the second power wire PVEE are provided in the same layer. The sixth sub-portion 34 and the second power wire PVEE are provided in different layers.

With reference to the foregoing analysis, it can be learned that the distance between the second power wires PVEE is relatively large. Therefore, when the first grid bar 31 and the fifth sub-portion 33 in the second grid bar 32 are disposed in the film layer of the second power wire PVEE, line widths that can be set for the first grid bar 31 and the fifth sub-portion 33 in the second grid bar 32 can be increased to reduce the load of the electrode block 23.

In an embodiment of the present disclosure, the sixth sub-portion 34 in the second grid bar 32 may be provided in the same layer as the lapping electrode 9.

Figure 25:
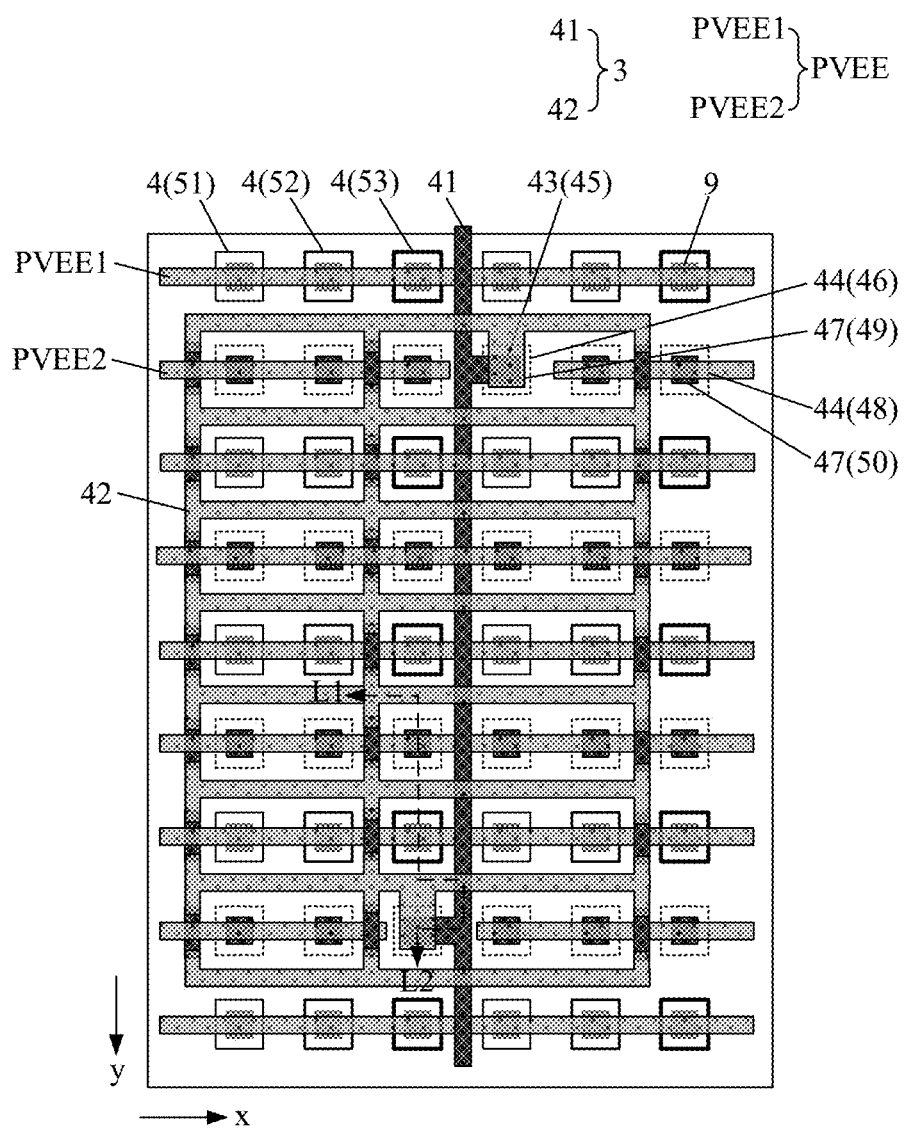
FIG. 25 is still another top view of a display panel according to an embodiment of the present disclosure.
Figure 26:
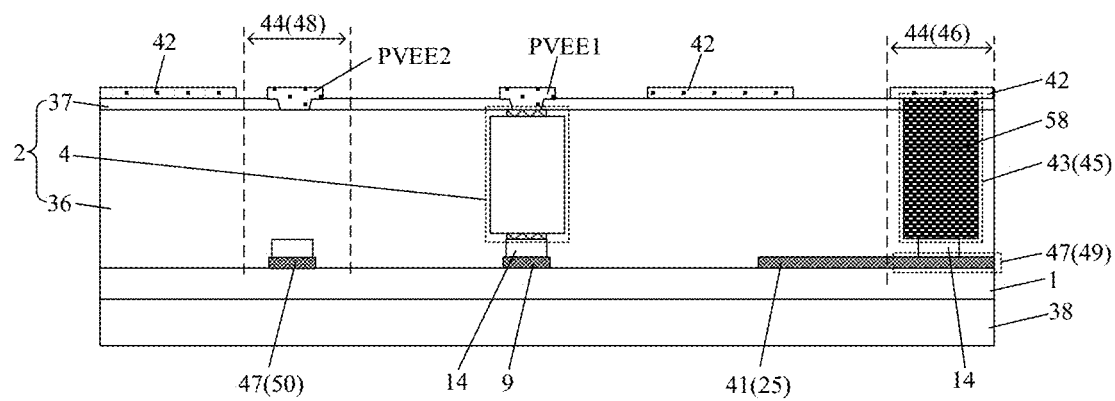
FIG. 26 is a cross-sectional view along L1-L2 shown in FIG. 25.

In a feasible implementation, as shown in FIG. 25 and FIG. 26, FIG. 25 is still another top view of a display panel according to an embodiment of the present disclosure, and FIG. 26 is a cross-sectional view along L1-L2 shown in FIG. 25, the touch structure 3 includes a first structure 41 and a second structure 42. The first structure 41 is located between the light-emitting device layer 2 and the circuit layer 1. At least part of the second structure 42 is located at the side of the light-emitting device layer 2 away from the circuit layer 1. For at least part of the second structure 42, there is a connection via 43 between a part of the second structure 42 located at the side of the light-emitting device layer 2 away from the circuit layer 1 and the first structure 41. That is, at least part of the second structure 42 is electrically connected to the first structure 41. The connection via 43 includes a first connection via hole 45.

The display panel includes a repair region 44 adjacent to the vertical light-emitting diode 4. The repair regions 44 include a first repair region 46. The first connection via hole 45 is located in the first repair region 46.

The repair region 44 is a region used for accommodating a spare vertical light-emitting diode. Before delivery of the display panel from the factory, a lighting test is usually performed on the display panel to detect whether the vertical light-emitting diodes 4 in the display panel can emit light normally. When a vertical light-emitting diode 4 that cannot emit light normally is detected, a spare vertical light-emitting diode can be rebound in the repair region 44 beside the damaged vertical light-emitting diode 4 to use the spare vertical light-emitting diode to emit light in place of the damaged vertical light-emitting diode 4.

In an implementation, part of the repair regions 44 (the first repair region 46) is no longer used to bind the space vertical light-emitting diode; instead, it is used for providing the first connection via hole 45. In this way, the first connection via hole 45 does not need to occupy other space. It should be noted that, usually, there are only few vertical light-emitting diodes 4 that cannot normally emit light in the display panel, or even there is no vertical light-emitting diode 4 that cannot normally emit light. In other words, spare vertical light-emitting diodes in only few repair regions 44 need to be rebound. Therefore, even though the first connection via hole 45 occupies part of the repair regions 44 to cause it not to be used for binding the spare vertical light-emitting diode, there is hardly any adverse impact on the display effect of the display panel.

Figure 27:
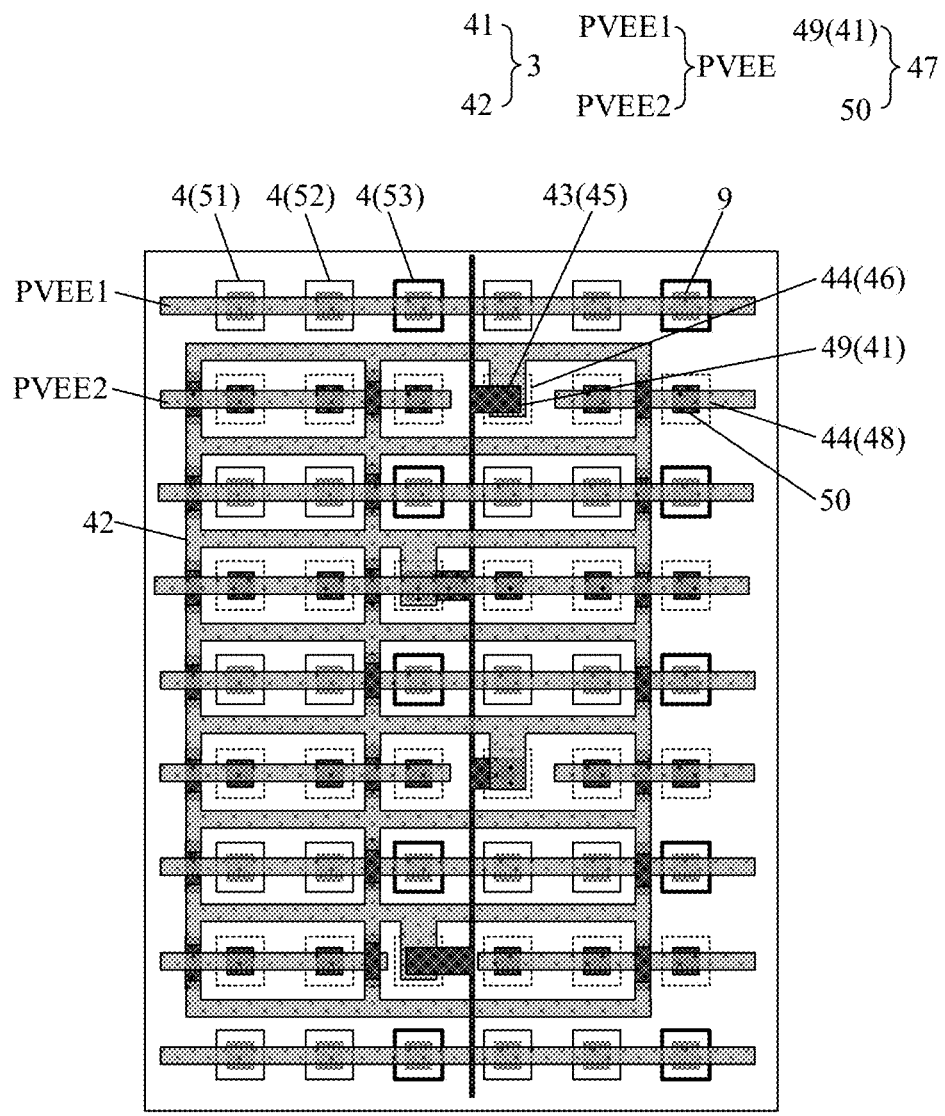
FIG. 27 is still another top view of a display panel according to an embodiment of the present disclosure.

In a feasible implementation, as shown in FIG. 27, FIG. 27 is still another top view of a display panel according to an embodiment of the present disclosure, the display panel further includes a connection portion 47 located in the repair region 44. The connection portions 47 (or the repair regions 44) may be evenly distributed within the display region.

The repair regions 44 further includes a second repair region 48. The second repair region 48 is a repair region 44 used for accommodating a spare vertical light-emitting diode. The connection portion 47 includes a first connection portion 49 located in the first repair region 46 and a second connection portion 50 located in the second repair region 48. At least one first connection portion 49 is reused as the first structure 41.

In an embodiment, each second connection portion 50 is connected to a lapping electrode 9 corresponding to a respective vertical light-emitting diode 4 adjacent to the second connection portion 50. When it is detected that a vertical light-emitting diode 4 cannot emit light normally and a spare light-emitting diode is rebound to a second connection portion 50 adjacent to the damaged vertical light-emitting diode 4, the spare light-emitting diode can receive a voltage transmitted by a driver circuit 80 corresponding to the vertical light-emitting diode 4 it replaces. For a second connection portion 50 above which there is no need to rebound a spare vertical light-emitting diode, a laser can be used to disconnect the connection between the second connection portion 50 and the lapping electrode 9. Alternatively, in another embodiment, before a test is performed on the display panel, each second connection portion 50 is not connected to a lapping electrode 9 corresponding to a respective vertical light-emitting diode 4 adjacent to the second connection portion 50. When it is detected that a vertical light-emitting diode 4 cannot emit light normally and a spare light-emitting diode is rebound to a second connection portion 50 adjacent to the damaged vertical light-emitting diode 4, a laser can be used to connect the second connection portion 50 to the lapping electrode 9 corresponding to the damaged vertical light-emitting diode 4, such that the spare light-emitting diode can receive a voltage transmitted by a driver circuit 80 corresponding to the vertical light-emitting diode 4 it replaces.

Because the second connection portion 50 in the second repair region 48 is no longer used to rebind the spare vertical light-emitting diode, in an embodiment of the present disclosure, the second connection portion 50 can be reused as the first structure 41, to achieve appropriate utilization of the original film layer.

In a feasible implementation, referring to FIG. 25 again, the vertical light-emitting diodes 4 include a red vertical light-emitting diode 51, a green vertical light-emitting diode 52, and a blue vertical light emitting diode 53.

Because green light has a greater impact on brightness, in an embodiment of the present disclosure, the first repair region 46 can be arranged to be adjacent to the red vertical light-emitting diode 51 and/or the blue vertical light emitting diode 53. That is, a repair region 44 originally used for accommodating a spare red vertical light-emitting diode and/or a spare blue vertical light emitting diode is set as the first repair region 46, to ensure that the repair region 44 used for accommodating a spare green vertical light-emitting diode is not occupied. In this way, when it is detected that the green vertical light-emitting diode 52 is damaged, it can be ensured that there is a position nearby to rebind the spare green vertical light-emitting diode.

Figure 28:
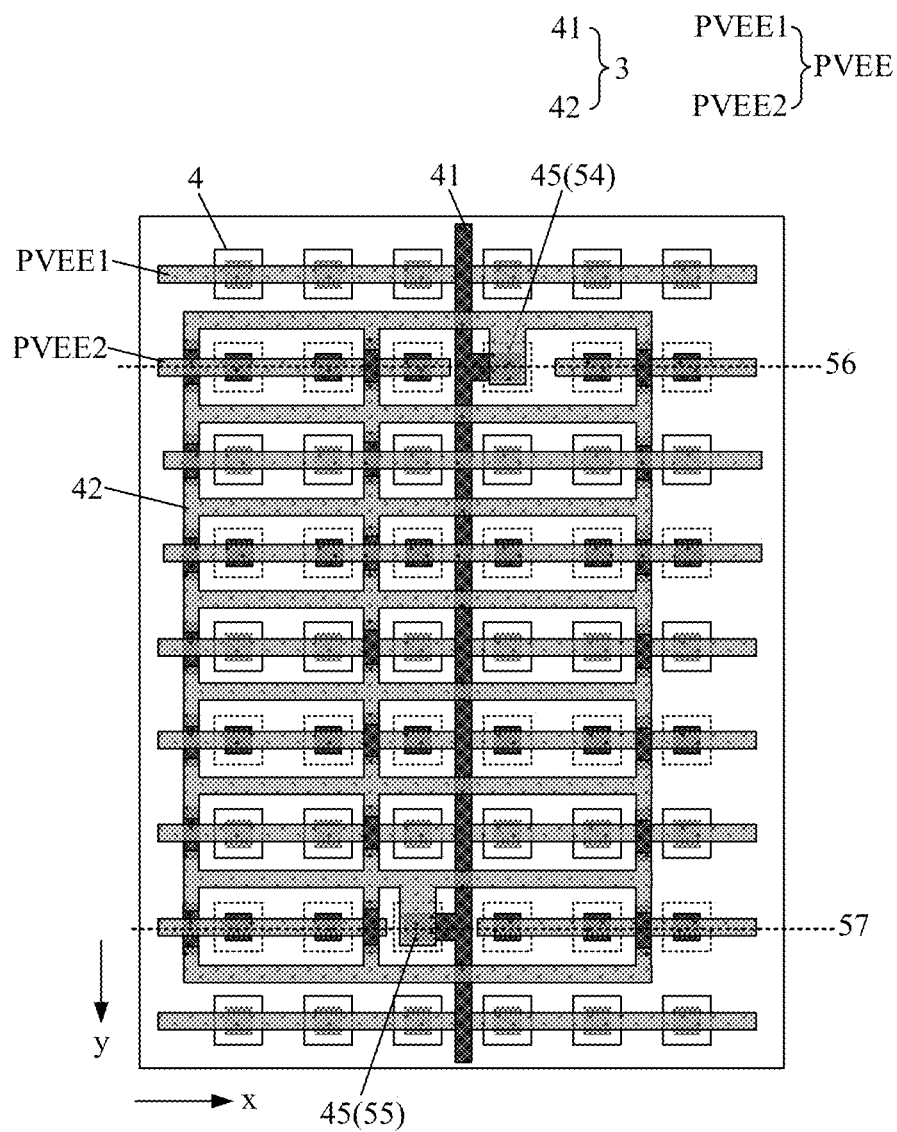
FIG. 28 is still another top view of a display panel according to an embodiment of the present disclosure.

In a feasible implementation, as shown in FIG. 28, FIG. 28 is still another top view of a display panel according to an embodiment of the present disclosure, the repair region 44 is located between vertical light-emitting diodes 4 that are adjacent in a second direction y. The first connection via hole 45 includes a first sub-via 54 and a second sub-via 55. The display panel includes a first virtual line 56 and a second virtual line 57 extending along a first direction x. The first direction x intersects the second direction y.

The first virtual line 56 runs through the first sub-via 54. The second virtual line 57 runs through the second sub-via 55. There is no other first connection via hole 45 between the first virtual line 56 and the second virtual line 57. In addition, between the first virtual line 56 and the second virtual line 57, at least three vertical light-emitting diodes 4 are arranged along the second direction y, to prevent first connection via holes 45 that are adjacent in the second direction y from continuously occupying repair regions 44 corresponding to adjacent vertical light-emitting diodes 4, thereby avoiding a case that several consecutive vertical light-emitting diodes 4 cannot emit light normally but there is no position to rebind any spare vertical light-emitting diode. This further weakens an impact of the first connection via hole 45 occupying the repair region 44 on the overall display effect.

Figure 29:
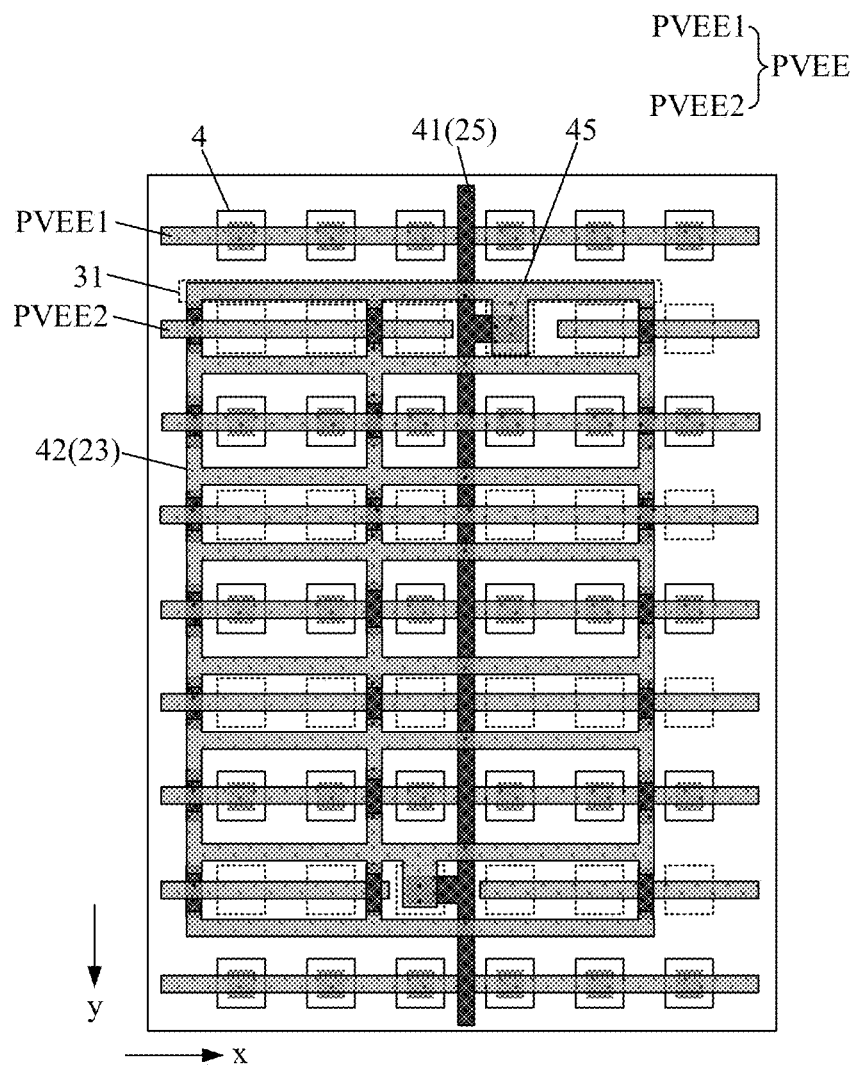
FIG. 29 is still another top view of a display panel according to an embodiment of the present disclosure.

In a feasible implementation, as shown in FIG. 29, FIG. 29 is still another top view of a display panel according to an embodiment of the present disclosure, the display panel further includes a second power wire PVEE. The second power wire PVEE is located at the side of the light-emitting device layer 2 away from the circuit layer 1.

The second power wire PVEE includes first power sub-wires PVEE1 and second power sub-wires PVEE2 that are alternately arranged. The first power sub-wire PVEE1 is electrically connected to the vertical light-emitting diode 4. In a direction perpendicular to a plane of the display panel, the second power sub-wire PVEE2 overlaps the repair region 44.

The second structure 42 includes an electrode block 23. The electrode block 23 is in a shape of a grid. The electrode block 23 includes a first grid bar 31. The first grid bar 31 and the second power wire PVEE extend along a same direction and are provided in a same layer. The first grid bar 31 is located between the first power sub-wire PVEE1 and the second power sub-wire PVEE2. The first connection via hole 45 is formed between the first grid bar 31 in at least part of the second structure 42 and the first structure 41.

In a manufacturing process of the display panel, with the arrangement of the second power sub-wire PVEE2, after a spare vertical light-emitting diode is rebound, the second power sub-wire PVEE2 can be used to provide a second supply voltage to ensure that the spare vertical light-emitting diode can emit light normally. Based on such a structure, the first grid bar 31 is located between the first power sub-wire PVEE1 and the second power sub-wire PVEE2 and is provided in the same layer as the first power sub-wire PVEE1 and the second power sub-wire PVEE2, such that the first grid bar 31 and the second power wire PVEE can be appropriately arranged.

In actual products, heights of vertical light-emitting diodes 4 of different colors may or may not be consistent. Therefore, further, referring to FIG. 29 again, a distance between the first grid bar 31 and the second power sub-wire PVEE2 may be set to be less than a distance between the first grid bar 31 and the first power sub-wire PVEE1, that is, the first grid bar 31 is closer to the second power sub-wire PVEE2. In this way, no matter whether the heights of the vertical light-emitting diodes 4 of different colors are the same, or whether film layers of light-emitting device layers 2 at positions of the different vertical light-emitting diodes 4 are flat, there is no major impact on consistency of a vertical spacing between the first grid bar 31 and the first structure 41, thereby improving the reliability of the connection between the first grid bar 31 and the first structure 41.

In a feasible implementation, the second structure 42 includes an electrode block 23, and the first structure 41 includes a touch line 25 or a bridge 26. That is, with reference to FIG. 18 to FIG. 24, the first structure 41 may be the connection structure 24 described above.

For example, when the electrode block 23 is located at the side of the film layer of the second power wire PVEE away from the circuit layer 1, the electrode block 23 is a light-transmitting planar electrode. With reference to FIG. 18, the first structure 41 may include the touch line 25, and the first connection via hole 45 is formed between the electrode block 23 and the touch line 25. Alternatively, with reference to FIG. 20, the first structure 41 may include the bridge 26, and the first connection via hole 45 is formed between part of the electrode block 23 and the touch line 25.

Alternatively, when part of the electrode block 23 may be provided in a same layer as the second power wire PVEE, with reference to FIG. 22 and FIG. 23, the electrode block 23 is a grid-shaped electrode, the electrode block 23 includes a first grid bar 31, and the first grid bar 31 and the second power wire PVEE extend along a same direction and are provided in a same layer. In this case, with reference to FIG. 22, the first structure 41 may include a bridge 26, and there is a first connection via hole 45 between the first grid bar 31 of part of the electrode block 23 and the bridge 26. Alternatively, with reference to FIG. 23, the first structure 41 may include a touch line 25, and there is a first connection via hole 45 between the first grid bar 31 of the electrode block 23 and the touch line 25.

In a feasible implementation, referring to FIG. 26 again, a vertical electric conductor 58 is provided in the connection via 43. A height of the vertical electric conductor 58 is the same as a height of at least one of the vertical light-emitting diodes 4.

Similar to a transfer process of the vertical light-emitting diode 4, a vertical electric conductor 58 may also be transferred through the transfer process. The vertical electric conductor 58 has one side connected to the first structure 41 through an eutectic portion 14, and another side connected to the second structure 42.

It should be noted that, referring to FIG. 26, the light-emitting device layer 2 further includes an organic planarization layer 36 and a second planarization layer 37, and the organic planarization layer 36 has a relatively large thickness, such that the connection via 43 is relatively deep. Therefore, in the embodiments of the present disclosure, the transferred vertical electric conductor 58 with a relatively large height can be used to fill in the connection via 43 to connect the first structure 41 and the second structure 42, such that the first structure 41 and the second structure 42 have relatively high connection reliability. In addition, the light-emitting device layer 2 can have a better flatness by further causing the height of the vertical electric conductor 58 to be the same as the height of the at least part of the vertical light-emitting diode 4.

In a feasible implementation, referring to FIG. 3 again, the circuit layer 1 includes a driver circuit 80. The display panel further includes a lapping electrode 9. The lapping electrode 9 is located between the circuit layer 1 and the light-emitting device layer 2, and the lapping electrode 9 is electrically connected to the driver circuit 80 and the vertical light-emitting diode 4, respectively. Part of the touch structure 3 is provided in a same layer as the lapping electrode 9. Further, the part of the touch structure 3 located between the light-emitting device layer 2 and the circuit layer 1 may be provided in the same layer as the lapping electrode 9.

For example, referring to FIG. 3 and FIG. 4, the touch structure 3 may include a first touch electrode 7 and a second touch electrode 8. A first electrode strip 15 in the first touch electrode 7 may be provided in a same layer as the lapping electrode 9. A second electrode strip 16 in the first touch electrode 7 may be entirely or partially provided in a same layer as the lapping electrode 9. Alternatively, referring to FIG. 18 to FIG. 24, the touch structure 3 may include an electrode block 23 and a first structure 41, and the first structure 41 may be provided in a same layer as the lapping electrode 9.

As described above, electrode positions of the vertical light-emitting diodes 4 determine that the vertical light-emitting diode 4 can have a smaller size and a larger spacing. In this case, correspondingly, the lapping electrodes 9 may also have a relatively large spacing. Part of the touch structure 3 is disposed in the same layer as the lapping electrode 9, such that an original metal layer in the display substrate can be used to form the touch structure 3 without adding other metal layer, and a line width of the touch structure 3 can be increased to a certain extent, for example, a line width of the first electrode strip 15, the second electrode strip 16, or the first structure 41 can be increased, to reduce the load of the touch structure 3.

Figure 30:
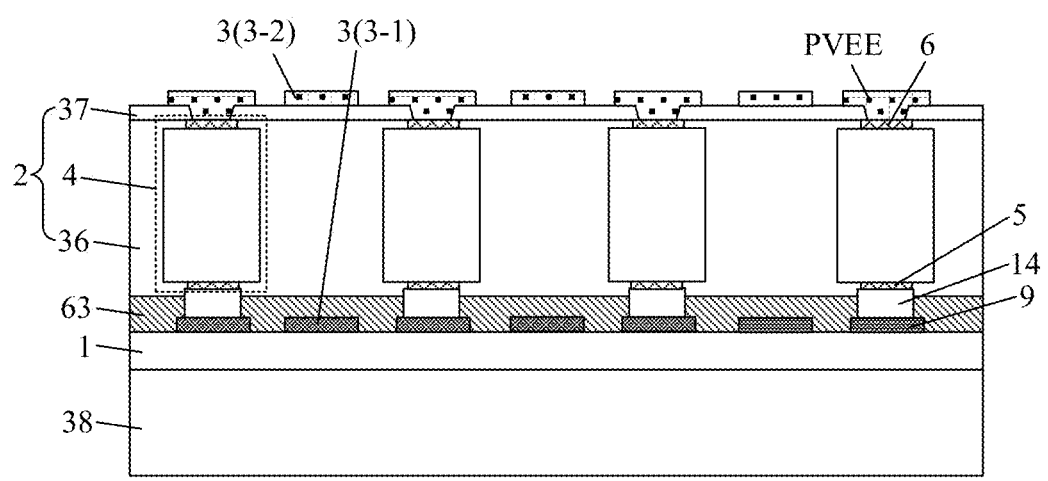
FIG. 30 is still another schematic cross-sectional view of a display panel according to an embodiment of the present disclosure.

Further, as shown in FIG. 30, FIG. 30 is still another schematic cross-sectional view of a display panel according to an embodiment of the present disclosure, the display panel further includes a protective layer 63. The protective layer 63 covers the part of the touch structure 3 that is provided in the same layer as the lapping electrode 9, such that the protective layer 63 is used to protect this part of the touch structure 3 that is provided in a same layer as the bonding metal, thereby avoiding causing damage to a film layer of this part of the touch structure 3 during transferring and connection of the vertical light-emitting diode 4. In addition, this can also prevent the first electrode 5 of the vertical light-emitting diode 4 from being connected to a film layer of an adjacent touch structure 3 due to alignment accuracy and other reasons during the transferring and connection of the vertical light-emitting diode 4.

The protective layer 63 may be an inorganic protective layer 63 formed of SiNx or other material. The protective layer 63 may be a whole-surface film layer, with an opening only at a position of the eutectic portion 14 to expose the eutectic portion 14, for subsequently electrical connection to the first electrode 5 of the vertical light-emitting diode 4.

In a feasible implementation, referring to FIG. 3 again, the display panel further includes a second power wire PVEE. The second power wire PVEE is electrically connected to the vertical light-emitting diode 4. The second power wire PVEE is located at the side of the light-emitting device layer 2 away from the circuit layer 1. Part of the touch structure 3 is provided in a same layer as the second power wire PVEE. Further, the part of the touch structure 3 located at the side of the light-emitting device layer 2 away from the circuit layer 1 may be provided in the same layer as the second power wire PVEE.

For example, referring to FIG. 3 and FIG. 4, the touch structure 3 may include a first touch electrode 7 and a second touch electrode 8. A third electrode strip 19 in the second touch electrode 8 may be provided in a same layer as the second power wire PVEE. A fourth electrode strip 20 in the second touch electrode 8 may be entirely or partially provided in a same layer as the second power wire PVEE. Alternatively, referring to FIG. 22 to FIG. 25, the touch structure 3 may include an electrode block 23 and a first structure 41. A first grid bar 31 in the electrode block 23 may be provided in a same layer as the second power wire PVEE. Part of a second grid bar 32 in the electrode block 23 may be provided in a same layer as the second power wire PVEE.

In such an arrangement manner, this part of structure in the touch structure 3 located at the side of the light-emitting device layer 2 away from the circuit layer 1 only needs to be formed by using an original film layer in the display substrate without adding any other additional metal layer, such that the overall thickness of the module is smaller. In addition, with reference to the foregoing analysis, it can be learned that the vertical light-emitting diodes 4 are small in size and have large spacings. Therefore, a gap between the first power wires PVDD is relatively large. In this case, even though part of the touch structure 3 is provided in the same layer as the second power wire PVEE, there is no major restriction on a line width of the part of the touch structure 3.

In a feasible implementation, referring to FIG. 11 to FIG. 13 again, the display panel further includes a second power wire PVEE. The second power wire PVEE is electrically connected to the vertical light-emitting diode 4. The second power wire PVEE is located at the side of the light-emitting device layer 2 away from the circuit layer 1. A film layer of part of the touch structure 3 is located at a side of a film layer of the second power wire PVEE away from the circuit layer 1. Further, the part of the touch structure 3 located at the side of the light-emitting device layer 2 away from the circuit layer 1 may be located at the side of the film layer of the second power wire PVEE away from the circuit layer 1.

For example, referring to FIG. 11 to FIG. 13, the touch structure 3 may include a first touch electrode 7 and a second touch electrode 8. A film layer of the second touch electrode 8 may be located at the side of the film layer of the second power wire PVEE away from the circuit layer 1. Alternatively, referring to FIG. 18 to FIG. 21, the touch structure 3 may include an electrode block 23 and a first structure 41. A film layer of the electrode block 23 may be located at the side of the film layer of the second power wire PVEE away from the circuit layer 1.

Based on such an arrangement manner, there is no need to consider a risk of a short circuit between the part of the touch structure 3 located at the side of the light-emitting device layer 2 away from the circuit layer 1 and the second power wire PVEE. Therefore, a line width, a shape, and other design of this part of the touch structure 3 can be more flexible. For example, the touch structure 3 includes an electrode block 23, and when the film layer of the electrode block 23 is located at the side of the film layer of the second power wire PVEE away from the circuit layer 1, the electrode block 23 may be a light-transmitting planar electrode or may be an opaque grid-shaped electrode.

Figure 31:
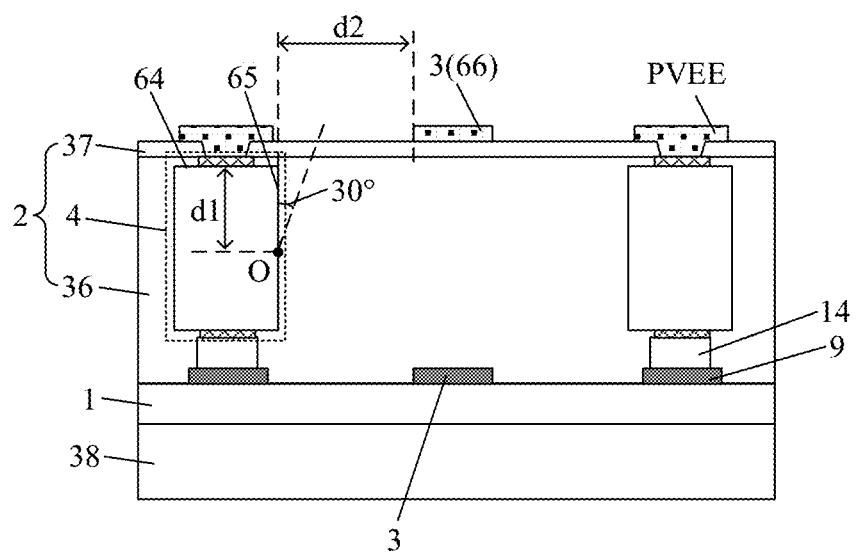
FIG. 31 is still another schematic cross-sectional view of a display panel according to an embodiment of the present disclosure.

In a feasible implementation, as shown in FIG. 31, FIG. 31 is still another schematic cross-sectional view of a display panel according to an embodiment of the present disclosure, the vertical light-emitting diode 4 includes a light exit surface 64 and a side face 65 intersecting the light exit surface. A distance between a geometric center point O of the side face 65 and the light exit surface 64 is d1. The touch structure 3 includes a first part 66. The first part 66 is located at the side of the light-emitting device layer 2 away from the circuit layer 1. In a direction perpendicular to a plane of the display panel, a minimum distance between the first part 66 and the light exit surface 64 is d2, and $d2 > d1 \times \sin 30°$.

When the minimum distance d2 between the first part 66 and the light exit surface 64 meets the foregoing condition, some oblique light emitted by the vertical light-emitting diode 4 can be prevented from being shielded due to a case that the first part 66 is too close to the light exit surface of the vertical light-emitting diode 4, thereby ensuring that the vertical light-emitting diode 4 has a larger light exit angle.

Figure 32:
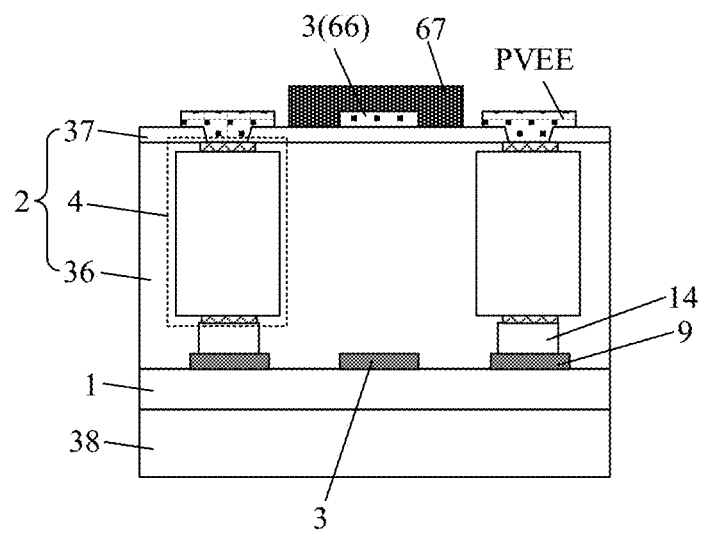
FIG. 32 is still another schematic cross-sectional view of a display panel according to an embodiment of the present disclosure.

In a feasible implementation, as shown in FIG. 32, FIG. 32 is still another schematic cross-sectional view of a display panel according to an embodiment of the present disclosure, the touch structure 3 includes a first part 66. The first part 66 is located at the side of the light-emitting device layer 2 away from the circuit layer 1. The display panel further includes a black matrix 67. The black matrix 67 covers the first part 66 and exposes the vertical light-emitting diode 4.

When the first part 66 is located at the side of the light-emitting device layer 2 away from the circuit layer 1, the first part 66 is closer to the light exit surface of the display panel and may cause obvious reflection of ambient light. Therefore, the black matrix 67 is disposed above the first part 66 to cover it, such that the black matrix 67 can be used to reduce the reflection of ambient light by the first part 66. In addition, the black matrix 67 can also be used to reduce light crosstalk between adjacent vertical light-emitting diodes 4.

Figure 33:
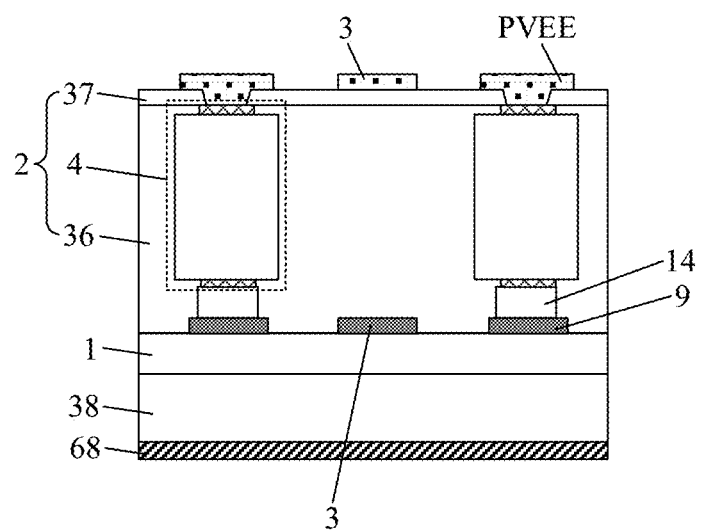
FIG. 33 is still another schematic cross-sectional view of a display panel according to an embodiment of the present disclosure.

In a feasible implementation, as shown in FIG. 33, FIG. 33 is still another schematic cross-sectional view of a display panel according to an embodiment of the present disclosure, the touch structure 3 is used for electromagnetic touch. For such a touch structure 3, refer to the description corresponding to the positions in FIG. 4 and FIG. 15. The display panel further includes an electromagnetic signal reflective layer 68. The electromagnetic signal reflective layer 68 is located at a side of the circuit layer 1 away from the light-emitting device layer 2. In an example, the electromagnetic signal reflective layer 68 may be located at a side of a substrate 38 facing away from the circuit layer 1, to prevent interference and coupling of electromagnetic signals to the bottom of the display panel by using the electromagnetic signal reflective layer 68, thereby achieving signal enhancement at the top of the display panel.

In addition, it should also be noted that in this embodiment of the present disclosure, a plurality of second power wires PVEE can be connected together outside the display region through bridge lines to facilitate signal transmission on the second power wires PVEE.

Figure 34:
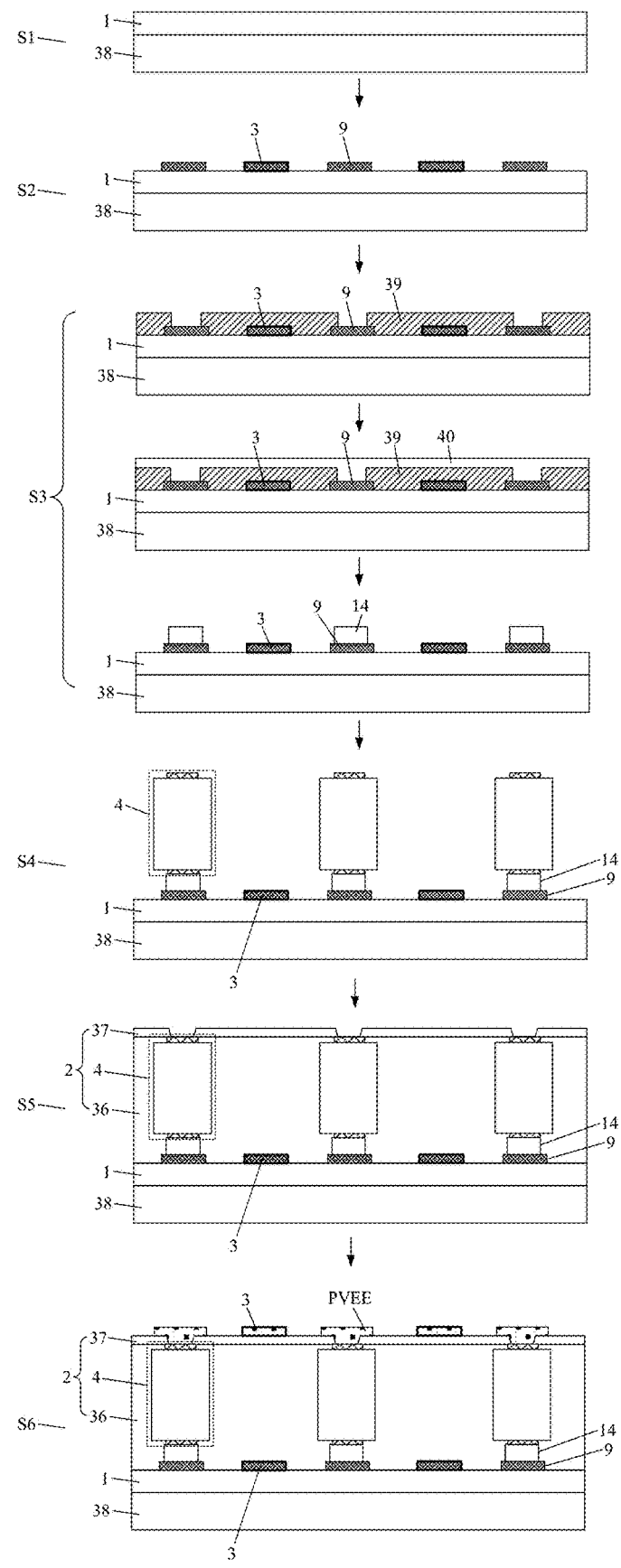
FIG. 34 is a process flowchart of a display panel according to an embodiment of the present disclosure.

In addition, an embodiment of the present disclosure further provides a schematic description on a process flow of the foregoing display panel:

As shown in FIG. 34, FIG. 34 is a process flowchart of a display panel according to an embodiment of the present disclosure, a manufacturing process of the display panel includes the following steps.

At S1, a circuit layer 1 is formed on a substrate 38.

At S2, a lapping electrode 9 and part of a touch structure 3 are formed above the circuit layer 1, and the lapping electrode 9 is electrically connected to a driver circuit 80 in the circuit layer 1 (not shown).

At S3, an eutectic portion 14 is formed.

In an example, a photoresist 39 may be first formed above the lapping electrode 9, and the photoresist 39 is etched to expose the lapping electrode 9. Then, an eutectic layer 40 is formed to form an eutectic portion 14 one-to-one corresponding to the lapping electrode 9. Then, the photoresist 39 is removed.

At S4, a vertical light-emitting diode 4 is transferred to the eutectic portion 14, such that the vertical light-emitting diode 4 is connected to the eutectic portion 14.

At S5, an organic planarization layer 36 and a second planarization layer 37 are formed.

At S6, a second power wire PVEE and a part of the touch electrode are formed above the second planarization layer 37, and the second power wire PVEE is electrically connected to the vertical light-emitting diode 4.

Figure 35:
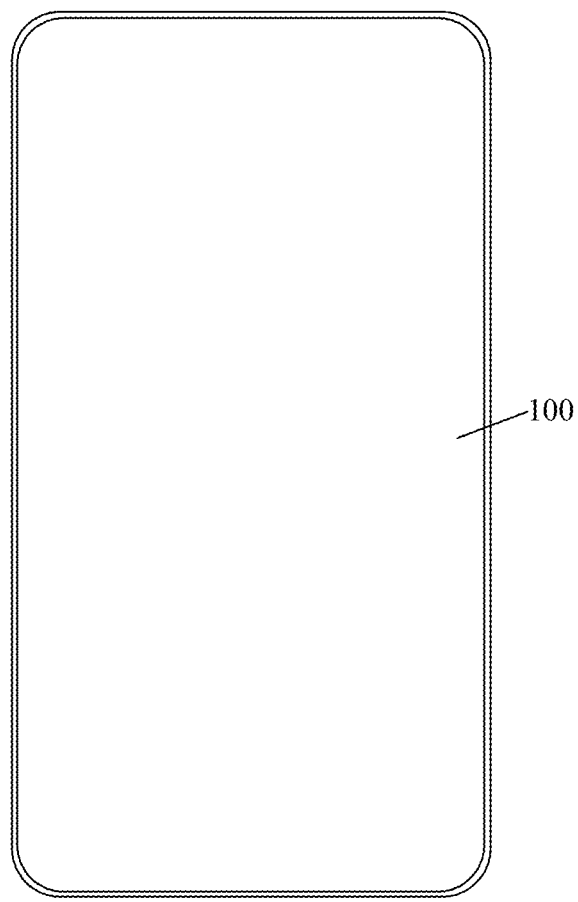
FIG. 35 is a schematic structural diagram of a display device according to an embodiment of the present disclosure.

Based on a same inventive concept, the embodiments of the present disclosure further provide a display device. FIG. 35 is a schematic structural diagram of a display device according to an embodiment of the present disclosure. As shown in FIG. 35, the display device includes the foregoing display panel 100. A structure of the display panel 100 has been described in detail in the foregoing embodiments, and will not be described herein again. It should be noted that the display device shown in FIG. 35 is for schematic description only, and the display device may be any electronic device with a display function, such as a mobile phone, a tablet computer, a notebook computer, an e-book, or a television.

The above descriptions are merely preferred embodiments of the present disclosure, and are not intended to limit the present disclosure. Any modifications, equivalent replacements, improvements, and the like made within the spirit and principle of the present disclosure shall fall within the protection scope of the present disclosure.

Finally, it should be noted that the above embodiments are merely intended to describe the technical solutions of the present disclosure, rather than to limit the present disclosure. Although the present disclosure is described in detail with reference to the above embodiments, persons of ordinary skill in the art should understand that they may still make modifications to the technical solutions described in the above embodiments or make equivalent replacements to some or all technical features thereof, without departing from the essence of the technical solutions in the embodiments of the present disclosure.

What is claimed is:

1. A display panel, comprising:
    a circuit layer;
    a light-emitting device layer located at a side of the circuit layer and comprising vertical light-emitting diodes; and
    a touch structure, wherein a part of the touch structure is located between the light-emitting device layer and the circuit layer, and/or another part of the touch structure is located at a side of the light-emitting device layer away from the circuit layer,
    wherein the circuit layer comprises driver circuits, one of the driver circuits is electrically connected to a respective one of the vertical light-emitting diodes through a lapping electrode, and one of the driving circuits comprises a respective one transistor corresponding to a respective one vertical light-emitting diode, wherein the respective one lapping electrode is electrically connected to the respective one transistor and is also electrically connected to the respective one vertical light-emitting diode through an eutectic portion corresponding to the respective one electrode, to form a signal transmission path between the one driving circuit and the respective one vertical light-emitting diode.

2. The display panel according to claim 1, wherein the touch structure comprises first touch electrodes and second touch electrodes, and in a direction perpendicular to a plane of the display panel, the first touch electrode overlaps the second touch electrode;
    wherein at least part of the first touch electrodes is located between the light-emitting device layer and the circuit layer, and/or at least part of the second touch electrodes is located at the side of the light-emitting device layer away from the circuit layer.

3. The display panel according to claim 2, wherein the lapping electrode is located between the circuit layer and the light-emitting device layer; and
    one of the first touch electrodes comprises at least one first electrode strip extending along a first direction, and the first electrode strip and the lapping electrode are provided in a same layer.

4. The display panel according to claim 3, wherein the first touch electrodes and the second touch electrodes are used for capacitive touch; and
    one of the first touch electrodes comprises first electrode strips extending along the first direction and second electrode strips extending along a second direction intersecting the first direction, and the one of the first touch electrodes is in a shape of a grid or a lattice, and the second electrode strips and the lapping electrode are provided in a same layer.

5. The display panel according to claim 3, wherein the first touch electrodes and the second touch electrodes are used for electromagnetic touch; and
    one of the first touch electrodes comprises two first electrode strips extending along the first direction and one second electrode strip extending along a second direction intersecting the first direction, the one second electrode strip is connected to end portions of the two first electrode strips, and the lapping electrode and at least part of the second electrode strip are provided in a same layer.

6. The display panel according to claim 5, wherein in the direction perpendicular to the plane of the display panel, the second electrode strip in at least one of the first touch electrodes overlaps the first electrode strip in at least another one of the first touch electrodes;

wherein at least one of the second electrode strips comprises a first sub-portion not overlapping the first electrode strip and a second sub-portion overlapping the first electrode strip, the first sub-portion and the lapping electrode are provided in a same layer, and the second sub-portion and the lapping electrode are provided in different layers.

7. The display panel according to claim 3, wherein the circuit layer comprises a first power wire extending along a second direction intersecting the first direction, and the first power wire is electrically connected to the driver circuit.

8. The display panel according to claim 3, wherein the display panel further comprises at least one second power wire extending along a second direction intersecting the first direction, and the second power wire is electrically connected to the vertical light-emitting diode, the second power wire is located at the side of the light-emitting device layer away from the circuit layer; and the second touch electrode comprises third electrode strips extending along the second direction, the third electrode strips are located at the side of the light-emitting device layer away from the circuit layer, and adjacent ones of the third electrode strips are spaced apart by at least one second power wire.

9. The display panel according to claim 8, wherein the third electrode strips and the at least one second power wire are provided in a same layer.

10. The display panel according to claim 9, wherein the first touch electrodes and the second touch electrodes are used for capacitive touch; and one of the second touch electrodes comprises third electrode strips and two fourth electrode strips, the two fourth electrode strips extend along the first direction, one of the two fourth electrode strips is connected to first end portions of the third electrode strips, the other one of the two fourth electrode strips is connected to second end portions of the third electrode strips, and the fourth electrode strips and the at least one second power wire are provided in a same layer.

11. The display panel according to claim 9, wherein a film layer of the third electrode strips is located at a side of a film layer of the at least one second power wire away from the light-emitting device layer.

12. The display panel according to claim 11, wherein the first touch electrodes and the second touch electrodes are used for capacitive touch; and one of the second touch electrodes comprises third electrode strips and fourth electrode strips, the fourth electrode strips extend along the first direction, the one of the second touch electrodes is in a shape of a grid or a lattice, and the fourth electrode strips and the third electrode strips are provided in a same layer.

13. The display panel according to claim 12, wherein adjacent ones of the fourth electrode strips in the one of the second touch electrodes are spaced apart by at least two vertical light-emitting diodes arranged along the second direction.

14. The display panel according to claim 9, wherein the first touch electrodes and the second touch electrodes are used for electromagnetic touch; and one of the second touch electrodes comprises two third electrode strips and one fourth electrode strip, the one fourth electrode strip extends along the first direction, the one fourth electrode strip is connected to end portions of the two third electrode strips, and the two third electrode strips and at least part of the fourth electrode strip are provided in a same layer.

15. The display panel according to claim 14, wherein in the direction perpendicular to the plane of the display panel, the fourth electrode strip in at least one of the second touch electrodes overlaps the third electrode strip in at least another one of the second touch electrodes;

wherein at least part of the fourth electrode strip comprises a third sub-portion not overlapping the third electrode strip and a fourth sub-portion overlapping the third electrode strip, the third sub-portion and the third electrode strip are provided in a same layer, and the fourth sub-portion and the third electrode strip are provided in different layers.

16. The display panel according to claim 1, wherein the touch structure comprises at least one electrode block and a connection structure, and the connection structure is electrically connected to at least part of the at least one electrode block;

wherein the connection structure is located between the light-emitting device layer and the circuit layer, and/or at least part of the at least one electrode block is located at the side of the light-emitting device layer away from the circuit layer.

17. The display panel according to claim 16, wherein the connection structure comprises touch lines, and one of the at least one electrode block is electrically connected to at least one touch line of the touch lines.

18. The display panel according to claim 16, wherein the connection structure comprises a bridge, and adjacent ones of the at least at electrode block are electrically connected to each other through the bridge.

19. The display panel according to claim 16, further comprising a second power wire, wherein the second power wire is electrically connected to the vertical light-emitting diode, and the second power wire is located at the side of the light-emitting device layer away from the circuit layer;

wherein a film layer of the at least one electrode block is located at a side of a film layer of the second power wire away from the circuit layer.

20. The display panel according to claim 16, further comprising a second power wire, wherein the second power wire is electrically connected to the vertical light-emitting diode, and the second power wire is located at the side of the light-emitting device layer away from the circuit layer;

wherein one of the at least one electrode block is in a shape of a grid, the electrode block comprises a first grid bar and a second grid bar, an extension direction of the first grid bar is parallel to an extension direction of the second power wire, and an extension direction of the second grid bar intersects the extension direction of the second power wire; and the first grid bar and the second power wire are provided in a same layer, the second grid bar comprises a fifth sub-portion not overlapping the second power wire and a sixth sub-portion overlapping the second power wire, the fifth sub-portion and the second power wire are provided in the same layer, and the sixth sub-portion and the second power wire are provided in different layers.

21. The display panel according to claim 1, wherein the touch structure comprises a first structure and a second structure, the first structure is located between the light-emitting device layer and the circuit layer, and at least part of the second structure is located at the side of the light-emitting device layer away from the circuit layer;
a connection via is formed between part of the second structure located at the side of the light-emitting device layer away from the circuit layer and the first structure, and the connection via comprises a first connection via hole; and
the display panel comprises repair regions adjacent to the vertical light-emitting diodes, the repair regions comprise a first repair region, and the first connection via hole is located in the first repair region.

22. The display panel according to claim 21, further comprising connection portions located in the repair regions; wherein the repair regions further comprise a second repair region, the connection portions comprises a first connection portion located in the first repair region and a second connection portion located in the second repair region, and at least one of the first connection portions is reused as the first structure.

23. The display panel according to claim 21, wherein the vertical light-emitting diodes comprise a red vertical light-emitting diode, a green vertical light-emitting diode, and a blue vertical light emitting diode; and
the first repair region is adjacent to the red vertical light-emitting diode and/or the blue vertical light emitting diode.

24. The display panel according to claim 21,
wherein one of the repair regions is located between vertical light-emitting diodes that are adjacent in a second direction;
the first connection via hole comprises a first sub-via and a second sub-via, the display panel comprises a first virtual line and a second virtual line extending along a first direction intersecting the second direction; and
the first virtual line runs through the first sub-via, the second virtual line runs through the second sub-via, there is no other first connection via hole between the first virtual line and the second virtual line, and at least three vertical light-emitting diodes arranged along the second direction are provided between the first virtual line and the second virtual line.

25. The display panel according to claim 21, further comprising a second power wire located at the side of the light-emitting device layer away from the circuit layer;
wherein the second power wire comprises a first power sub-wire and a second power sub-wire that are alternately arranged, the first power sub-wire is electrically connected to the vertical light-emitting diode, and in a direction perpendicular to a plane of the display panel, the second power sub-wire overlaps the repair region; and
the second structure comprises an electrode block, the electrode block is in a shape of a grid, the electrode block comprises a first grid bar, the first grid bar and the second power wire extend along a same direction and are provided in a same layer, the first grid bar is located between the first power sub-wire and the second power sub-wire, and the first connection via hole is formed between the first grid bar in at least part of the second structure and the first structure.

26. The display panel according to claim 25, wherein a distance between the first grid bar and the second power sub-wire is less than a distance between the first grid bar and the first power sub-wire.

27. The display panel according to claim 21, wherein the second structure comprises an electrode block, and the first structure comprises a touch line or a bridge.

28. The display panel according to claim 21, wherein a vertical electric conductor is provided in the connection via, and a height of the vertical electric conductor is the same as a height of at least one of the vertical light-emitting diodes.

29. The display panel according to claim 1, wherein the circuit layer comprises a driver circuit, the display panel further comprises a lapping electrode, the lapping electrode is located between the circuit layer and the light-emitting device layer, and the lapping electrode is electrically connected to the driver circuit and the vertical light-emitting diode;
wherein part of the touch structure is provided in a same layer as the lapping electrode.

30. The display panel according to claim 29, further comprising a protective layer, wherein the protective layer covers part of the touch structure that is provided in the same layer as the lapping electrode.

31. The display panel according to claim 1, further comprising a second power wire, wherein the second power wire is electrically connected to the vertical light-emitting diode, and the second power wire is located at the side of the light-emitting device layer away from the circuit layer; and
part of the touch structure is provided in the same layer as the second power wire.

32. The display panel according to claim 1, further comprising a second power wire, wherein the second power wire is electrically connected to the vertical light-emitting diode, and the second power wire is located at the side of the light-emitting device layer away from the circuit layer; and
a film layer of part of the touch structure is located at a side of a film layer of the second power wire away from the circuit layer.

33. The display panel according to claim 1, wherein one of the vertical light-emitting diodes comprises a light exit surface and a side face intersecting the light exit surface, and a distance between a geometric center point of the side face and the light exit surface is d1; and the touch structure comprises a first part located at the side of the light-emitting device layer away from the circuit layer, and in a direction perpendicular to a plane of the display panel, a minimum distance between the first part and the light exit surface is d2, wherein $d2 > d1 \times \sin 30°$.

34. The display panel according to claim 1, wherein the touch structure comprises a first part located at the side of the light-emitting device layer away from the circuit layer; and the display panel further comprises a black matrix, and the black matrix covers the first part and exposes the vertical light-emitting diode.

35. The display panel according to claim 1, wherein the touch structure is used for electromagnetic touch; and the display panel further comprises an electromagnetic signal reflective layer located at a side of the circuit layer away from the light-emitting device layer.

36. A display device, comprising a display panel, wherein the display panel comprises:
a circuit layer;
a light-emitting device layer located at a side of the circuit layer and comprising vertical light-emitting diodes; and
a touch structure, wherein a part of the touch structure is located between the light-emitting device layer and the circuit layer, and/or another part of the touch structure is located at a side of the light-emitting device layer away from the circuit layer, wherein the circuit layer comprises driver circuits, one of the driver circuits is electrically connected to a respective one of the vertical light-emitting diodes through a lapping electrode, and one of the driving circuits comprises a respective one transistor corresponding to a respective one vertical light-emitting diode, wherein the respective one lapping electrode is electrically connected to the respective one transistor and is also electrically connected to the respective one vertical light-emitting diode through an eutectic portion corresponding to the respective one electrode, to form a signal transmission path between the one driving circuit and the respective one vertical light-emitting diode.

37. A display panel, comprising:

a circuit layer;

a light-emitting device layer located at a side of the circuit layer and comprising vertical light-emitting diodes; and a touch structure, wherein a part of the touch structure is located between the light-emitting device layer and the circuit layer, and/or another part of the touch structure is located at a side of the light-emitting device layer away from the circuit layer, wherein the touch structure comprises at least one electrode block and a connection structure, and the connection structure is electrically connected to at least part of the at least one electrode block; the connection structure is located between the light-emitting device layer and the circuit layer, and/or at least part of the at least one electrode block is located at the side of the light-emitting device layer away from the circuit layer; and the display panel further comprises a second power wire, the second power wire is electrically connected to the vertical light-emitting diode, and the second power wire is located at the side of the light-emitting device layer away from the circuit layer; and a film layer of the at least one electrode block is located at a side of a film layer of the second power wire away from the circuit layer.

* * * * *